US012519212B2

(12) United States Patent
Park et al.

(10) Patent No.: US 12,519,212 B2
(45) Date of Patent: Jan. 6, 2026

(54) ANTENNA MODULE AND ELECTRONIC DEVICE INCLUDING SAME

(71) Applicant: Samsung Electronics Co., Ltd., Suwon-si (KR)

(72) Inventors: Chanju Park, Suwon-si (KR); Junhwa Oh, Suwon-si (KR); Sanghyuk Wi, Suwon-si (KR); Jungi Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 18/272,917

(22) PCT Filed: Jan. 26, 2022

(86) PCT No.: PCT/KR2022/001376

§ 371 (c)(1),
(2) Date: Jul. 18, 2023

(87) PCT Pub. No.: WO2022/169182

PCT Pub. Date: Aug. 11, 2022

(65) Prior Publication Data

US 2024/0120642 A1 Apr. 11, 2024

(30) Foreign Application Priority Data

Feb. 2, 2021 (KR) ........................ 10-2021-0014879

(51) Int. Cl.
*H01Q 1/24* (2006.01)
*H01Q 21/24* (2006.01)

(52) U.S. Cl.
CPC ............. *H01Q 1/243* (2013.01); *H01Q 21/24* (2013.01)

(58) Field of Classification Search
CPC .......... H01Q 1/243; H01Q 21/24; H01Q 1/24; H01Q 21/0025; H01Q 21/0075;
(Continued)

(56) References Cited

U.S. PATENT DOCUMENTS

2016/0178730 A1 6/2016 Trotta et al.
2019/0148839 A1 5/2019 Lin et al.
(Continued)

FOREIGN PATENT DOCUMENTS

CN 111082230 A 4/2020
JP 2014-170989 A 9/2014
(Continued)

OTHER PUBLICATIONS

Extended European Search Report dated May 21, 2024, issued in European Patent Application No. 22749933.2.

*Primary Examiner* — Hoang V Nguyen
*Assistant Examiner* — Anna N Hamadyk
(74) *Attorney, Agent, or Firm* — Jefferson IP Law, LLP

(57) ABSTRACT

An antenna is provided. The antenna includes a communication circuit part; an antenna part stacked-up on or above the communication circuit part and comprising multiple antenna elements; and a network part disposed between the communication circuit part and the antenna part; at least one first subarray formed of a combination of some of the antenna elements; and at least one second subarray formed of a combination another of the antenna elements, and disposed to be point symmetric to the first subarray; a first transmission port corresponding to a transmission input terminal of the first subarray; a first reception port corresponding to a reception input terminal of the first subarray; a second transmission port corresponding to a transmission
(Continued)

input terminal of the second subarray; and a second reception port corresponding to a reception input terminal of the second subarray.

15 Claims, 22 Drawing Sheets

(58) Field of Classification Search
CPC .. H01Q 21/061; H01Q 1/2283; H04B 1/3827; G01S 2013/0245
See application file for complete search history.

(56) References Cited

U.S. PATENT DOCUMENTS

| | | | | |
|---|---|---|---|---|
| 2019/0356057 | A1 | 11/2019 | Carey et al. | |
| 2020/0021039 | A1 | 1/2020 | Pelletti et al. | |
| 2020/0036095 | A1 | 1/2020 | Elsherbini et al. | |
| 2020/0052403 | A1 | 2/2020 | Hong et al. | |
| 2020/0161766 | A1 | 5/2020 | Liu et al. | |
| 2020/0212567 | A1 | 7/2020 | Petersson et al. | |
| 2020/0212592 | A1 | 7/2020 | Liu | |
| 2021/0098895 | A1* | 4/2021 | Oshima | H01Q 21/065 |
| 2022/0231423 | A1 | 7/2022 | Park et al. | |

FOREIGN PATENT DOCUMENTS

| | | | |
|---|---|---|---|
| KR | 10-2016-0077002 | A | 7/2016 |
| KR | 10-2019-0095272 | A | 8/2019 |
| KR | 10-2020-0137166 | A | 12/2020 |

* cited by examiner

Series Feeding

Corporate Feeding

Hybrid Feeding

| AiP Stack-up (300) | | | | |
|---|---|---|---|---|
| Layer | Layer Num. | Material | Thickness [um] | Usage |
| | | SR | 15 | |
| Antenna Unit (301) | Layer 1 | CU | 15 | Stacked Patch |
| | | PPG | 40 | |
| | Layer 2 | CU | 15 | Radiator |
| | | PPG | 40 | |
| | Layer 3 | CU | 15 | Dummy, HIS |
| | | PPG | 40 | |
| | Layer 4 | CU | 15 | Dummy, HIS |
| | | PPG | 40 | |
| Feeding Network Unit (320) | Layer 5 | CU | 15 | Ground |
| | | PPG | 40 | |
| | Layer 6 | CU | 15 | Series/Hybrid/Corporate Top Feeding |
| | | PPG | 40 | |
| | Layer 7 | CU | 15 | Ground |
| Routing Unit (330) | Core | CCL | 150 | |
| | Layer 8 | CU | 15 | Ground |
| | | PPG | 40 | |
| | Layer 9 | CU | 15 | Routing/Corporate Bottom Feeding |
| | | PPG | 40 | |
| | Layer 10 | CU | 15 | Ground |
| RFIC Layer (303) | | PPG | 40 | |
| | Layer 11 | CU | 15 | RFIC |
| | | PPG | 40 | |
| | Layer 12 | CU | 15 | RFIC |
| | | PPG | 40 | |
| | Layer 13 | CU | 15 | RFIC |
| | | PPG | 40 | |
| | Layer 14 | CU | 15 | Ground |
| | | SR | 15 | |
| | | | 870 | |

FIG. 16

ANTENNA MODULE AND ELECTRONIC DEVICE INCLUDING SAME

CROSS-REFERENCE TO RELATED APPLICATION(S)

This application is a U.S. National Stage application under 35 U.S.C. § 371 of an International application number PCT/KR2022/001376, filed on Jan. 26, 2022, which is based on and claims priority to Korean patent application number 10-2021-0014879, filed on Feb. 2, 2021 in the Korean Intellectual Property Office, the disclosure of which is incorporated by reference herein in its entirety.

BACKGROUND

1. Field

Various embodiments disclosed herein relate to an antenna module, for example, an antenna module and/or an electronic device including same.

2. Description of the Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

Communication systems may include a transmission (Tx) and reception (Rx) integrated circuit for generating a transmission/reception signal and an antenna element for transmitting the signal by radio waves. As the frequency of use of an antenna increases, a combined form of an antenna and a communication circuit (e.g., an RFIC) has been developed to reduce transmission line loss. Generally, antenna elements with a designated arrangement may be used to acquire a high antenna gain in an ultra-high frequency.

SUMMARY

With respect to an antenna structure, as the ultra-high frequency band is used, although the physical size of antenna elements becomes smaller and the spacing between antenna elements in an array antenna becomes smaller, the number of inputs and outputs of communication circuits (e.g., an RFIC) does not decrease, and there may be limitation in reducing the physical size thereof. In case that the size (e.g., the size of an area in which antenna elements are arranged in an array antenna) of an antenna element is smaller than that of a communication circuit in the ultra-high frequency band, a space to connect a signal transmission line between the antenna element and the communication circuit becomes insufficient and thus it may be difficult to design an antenna module (or package) structure. When the communication frequency band becomes higher, for example, to use frequencies in the gigahertz band or terahertz band, an array antenna structure may be used, an antenna element for using the frequency band becomes smaller in size, and spacing between antenna elements becomes smaller to stabilize beam steering characteristics. Accordingly, insufficiency in space for connecting a signal transmission line between the antenna element and the communication circuit may be exacerbated.

According to various embodiments disclosed herein, design of an antenna module adopting a subarray antenna structure may maximize the use of physical space and minimize signal transmission line loss.

Various embodiments disclosed herein may provide a stable wireless communication environment in an ultra-high frequency band like terahertz band by implementing double polarization with multiple antenna modules adopting a subarray antenna structure.

Various embodiments disclosed herein may provide an antenna module and/or an electronic device including same which may reduce design and manufacturing costs while providing a stable wireless communication environment by implementing double polarization with a combination of multiple substantially identical antenna modules.

According to various embodiments disclosed herein, an antenna module and/or an electronic device including same may include a communication circuit part in which a communication circuit is disposed, an antenna part stacked-up on or above the communication circuit part and including multiple antenna elements, and a network part disposed between the communication circuit part and the antenna part and providing transmission lines for connecting the communication circuit and the antenna elements.

The antenna part may include at least one first subarray configured by a combination of a part of the antenna elements, and at least one second subarray configured by a combination of another part of the antenna elements and disposed to be point symmetric to the first subarray.

The network part may include a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray.

With respect to a symmetry point of the first subarray and the second subarray, the first transmission port may be disposed to be point symmetric to the second reception port, and the first reception port may be disposed to be point symmetric to the second transmission port.

According to various embodiments disclosed herein, an electronic device may include a first antenna module and a second antenna module which are arranged to be adjacent to each other, wherein each of the first antenna module and the second antenna module includes a communication circuit part in which a communication circuit is disposed, an antenna part arranged to be stacked-up on or over the communication circuit part and including multiple antenna elements, and a network part disposed between the communication circuit part and the antenna part and providing transmission lines for connecting the communication circuit and the antenna elements.

The antenna part may include at least one first subarray configured by a combination of a part of the antenna elements, and at least one second subarray configured by a combination of another part of the antenna elements and disposed to be point symmetric to the first subarray.

The network part may include a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray.

With respect to a first symmetry point of the first subarray and the second subarray, the first transmission port may be disposed to be point symmetric to the second reception port, and the first reception port may be disposed to be point symmetric to the second transmission port.

The first subarray of the first antenna module may be disposed to be point symmetric to the first subarray of the second antenna module.

With respect to a second symmetry point of the first subarray of the first antenna module and the first subarray of the second antenna module, the second subarray of the first antenna module may be disposed to be point symmetric to the second subarray of the second antenna module.

According to various embodiments disclosed herein, an antenna module and/or an electronic device including same may include a communication circuit part in which a communication circuit is disposed, an antenna part stacked-up on or above the communication circuit part and including antenna elements arranged in a 2n×2n array ("n" is a natural number), and a network part disposed between the communication circuit part and the antenna part and providing transmission lines for connecting the communication circuit and the antenna elements.

The antenna part may include multiple first subarrays configured by a part of the antenna elements arranged in an n×1 array, and multiple second subarrays each of which is configured by the other part of the antenna elements in an n×1 array and disposed to be point symmetric to one of the multiple first subarrays.

The network part may include a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray.

The first subarray and the second subarray are combined to form a 2×2n subarray.

With respect to a symmetry point of the first subarray and the second subarray, the first transmission port may be disposed to be point symmetric to the second reception port, and the first reception port may be disposed to be point symmetric to the second transmission port.

Various embodiments disclosed herein may provide an antenna module (or antenna in package) structure applicable in an ultra-high frequency.

The antenna module according to various embodiments disclosed herein may maximize the use of physical space and minimize signal transmission line loss by branch-designing an antenna structure including a subarray antenna element and a signal transmission line connected from a communication circuit to the antenna element.

The antenna module according to various embodiments disclosed herein may provide efficiency of module development by specifying a function for each layer and designing to be independent to optimize the internal structure of the module. In addition, various effects directly or indirectly identified through the disclosure may be provided.

Various embodiments disclosed herein may provide multiple antenna modules having different polarization characteristics while having substantially the same structure. For example, double polarization may be implemented by combining multiple antenna modules while reducing the time and cost required for the design, manufacturing process, and performance verification of manufactured products so as to provide enhanced communication performance.

BRIEF DESCRIPTION OF THE DRAWINGS

FIG. 16 is a view simply illustrating a stacking structure of an antenna module according to various embodiments disclosed herein.

DETAILED DESCRIPTION

Figure 1:
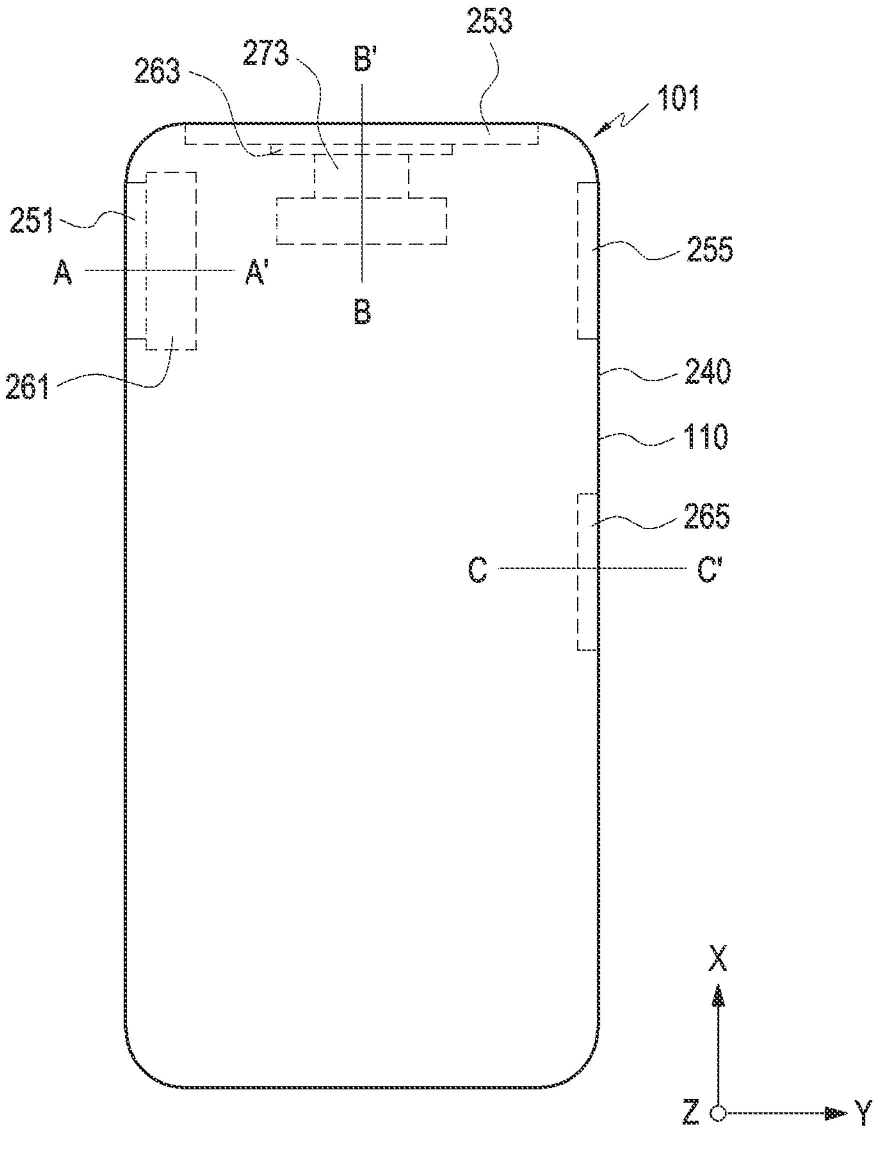
FIG. 1 illustrates an example of a structure of an electronic device according to various embodiments disclosed herein.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
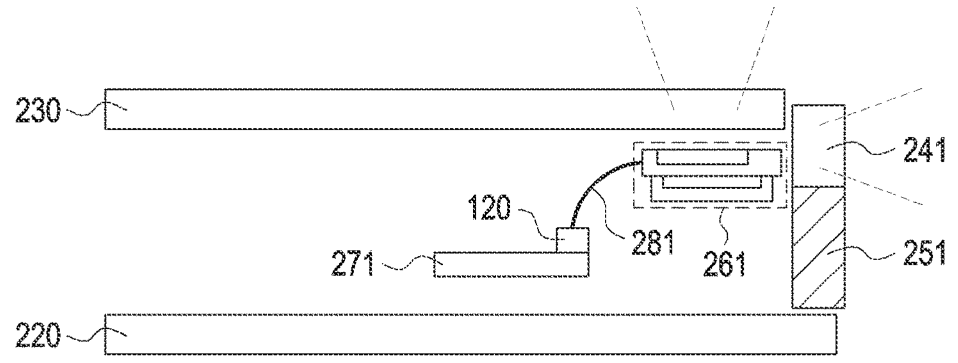
FIG. 2 is a sectional view taken along axis A-A' of FIG. 1.
Figure 3:
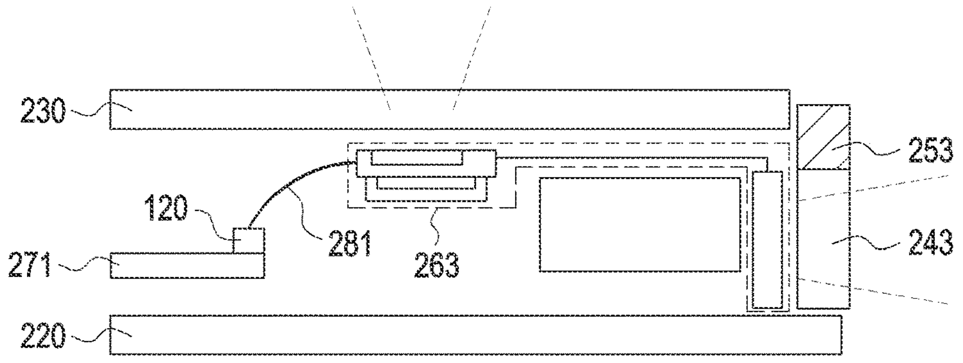
FIG. 3 is a sectional view taken along axis B-B' of FIG. 1.
Figure 4:
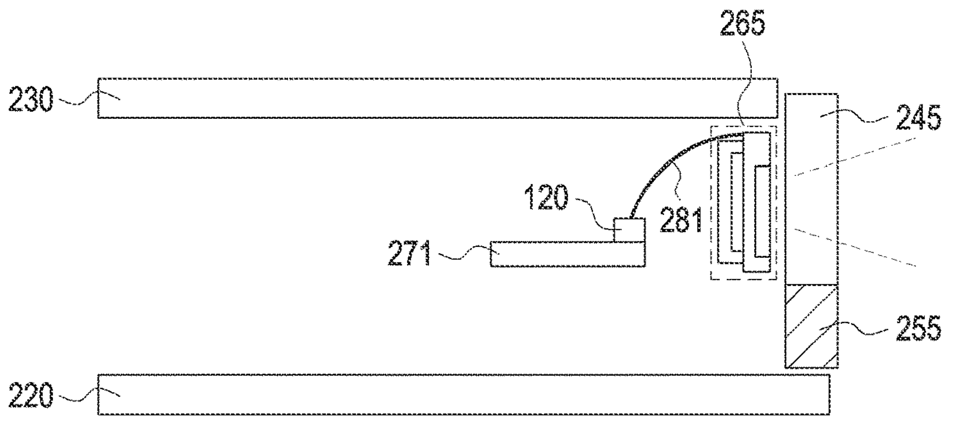
FIG. 4 is a sectional view taken along axis C-C' of FIG. 1.

FIG. 1 illustrates an example of a structure of an electronic device 101 according to various embodiments disclosed herein. FIG. 2 is a sectional view taken along axis A-A' of FIG. 1. FIG. 3 is a sectional view taken along axis B-B' of FIG. 1. FIG. 4 is a sectional view taken along axis C-C' of FIG. 1.

Referring FIG. 1 to FIG. 4, an electronic device 101 may include a housing 310 including a first plate 220 (e.g., front plate), a second plate 230 spaced apart from the first plate 220 and facing a direction opposite to the first plate (e.g., rear plate or rear glass), and a lateral member 240 surrounding a space between the first plate 220 and the second plate 230.

According to an embodiment, the first plate 220 may include a transparent material including a glass plate. The second plate 230 may include a non-conductive and/or conductive material. The lateral member 240 may include a conductive material and/or a non-conductive material. In an embodiment, at least a portion of the lateral member 240 may be integrally formed with the second plate 230. In an embodiment, the lateral member 240 may include first to third insulation parts 241, 243, and 245 and/or first to third conductive parts 251, 253, and 255. In another embodiment, the lateral member 240 may omit one of first to third insulation parts 241, 243, and 245 and/or first to third conductive parts 251, 253, and 255. For example, in case that the first to third insulation parts 241, 243, and 245 are omitted, the first to third insulation parts 241, 243, and 245 may be formed as conductive parts. For another example, in case that the first to third conductive parts 251, 253, and 255 are omitted, the first to third conductive parts 251, 253, and 255 may be formed as insulation parts.

According to an embodiment, the electronic device 101 may include a display shown through the first plate 220, a main printed circuit board (PCB) 271, and/or a mid-plate (not shown) in the space, and may selectively include other components in addition thereto.

According to an embodiment, the electronic device 101 may include a first antenna (e.g., the first conductive part 251), a second antenna (e.g., the second conductive part 253), or a third antenna (e.g., the third conductive part 255) in the space and/or a portion (e.g., the lateral member 240) of the housing 310. For example, the first to third antennas may function as antenna radiators supporting, for example, cellular communication (e.g., second generation (2G), 3G, 4G, or LTE and/or 5G), near field communication (e.g., Wi-Fi, Bluetooth, or NFC), and/or a global navigation satellite system (GNSS). In another embodiment, the first to third antennas may be used for performing wireless communication by using frequencies in the terahertz band.

According to an embodiment, the electronic device 101 may include a first antenna module 261, a second antenna module 263, and/or a third antenna module 265 for forming a directional beam. For example, the antenna modules 261, 263, and 265 may be used for 5G network communication, mm Wave communication, 60 GHz communication, WiGig communication, or 6G network communication. In an embodiment, the antenna modules 261 to 265 may be disposed in the space to be spaced apart from a metal member (e.g., the housing 110, the internal component 273, and/or the first to third antennas) of the electronic device 101. For another example, the antenna modules 261 to 265 may be disposed in the space to come in contact with the metal member (e.g., the housing 110 and/or the first to third conductive parts 251 to 255) of the electronic device 101.

Referring to FIG. 1, in an embodiment, the first antenna module 261 may be disposed at a left (the −Y axis) upper end, the second antenna module 263 may be disposed at an upper (the X axis) middle end, and the third antenna module 265 may be disposed at a right (the Y axis) middle. In another embodiment, the electronic device 101 may include additional antenna modules at additional positions (e.g., lower (the −X axis) middle) or a portion of the first to third antenna modules 261 to 265 may be omitted. According to an embodiment, the first to third antenna modules 261 to 265 may be electrically connected to at least one communication processor 120 disposed on a PCB 271 by using a conductive line 281 (e.g., coaxial cable or FPCB).

Referring to FIG. 2 illustrating a sectional view taken along axis A-A' of FIG. 1, the first antenna module 261 may include a first antenna array (not shown) and a second antenna array (not shown) and the first antenna array of the first antenna module may be disposed to radiate in a direction of the second plate 230 and the second antenna array may be disposed to radiate through the first insulation part 241.

Referring to FIG. 3 illustrating a sectional view taken along axis B-B' of FIG. 1, a first antenna array of the second antenna module 263 may be disposed to radiate in a direction of the second plate 230 and a second antenna array may be disposed to radiate through the second insulation part 243. In an embodiment, the first antenna array or the second antenna array may include a dipole antenna, a patch antenna, a monopole antenna, a slot antenna, or a loop antenna.

In an embodiment, the second antenna module 263 may include a first printed circuit board and a second printed circuit board electrically connected to the first printed circuit board. The first antenna array may be disposed on the first printed circuit board. The second antenna array may be disposed on the second printed circuit board. According to an embodiment, the first printed circuit board and the second printed circuit board may be connected through a flexible circuit board or a coaxial cable. The flexible circuit board and the coaxial cable may be disposed around an electric component (e.g., a receiver, a speaker, sensors, a camera, an ear jack, or a button).

Referring to FIG. 4 illustrating a cross-sectional view taken along axis C-C' of FIG. 1, the third antenna module 265 may be disposed to radiate toward the lateral member 240 of the housing 310. For example, an antenna array of the third antenna module 265 may be disposed to radiate through the third insulation part 245.

Figure 5:
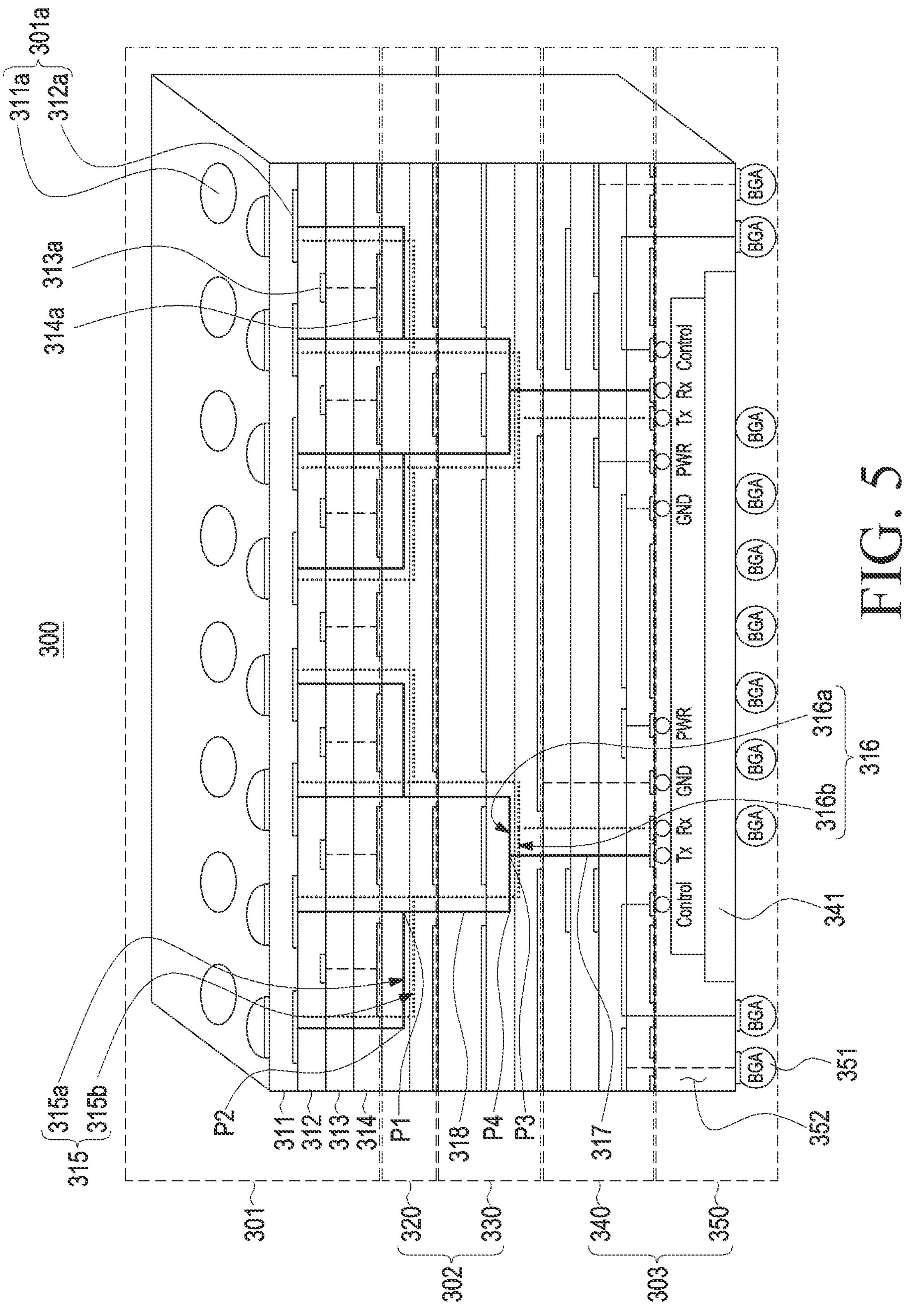
FIG. 5 is a sectional view of an antenna module disposed in an electronic device according to one of various embodiments disclosed herein.
Figure 6:
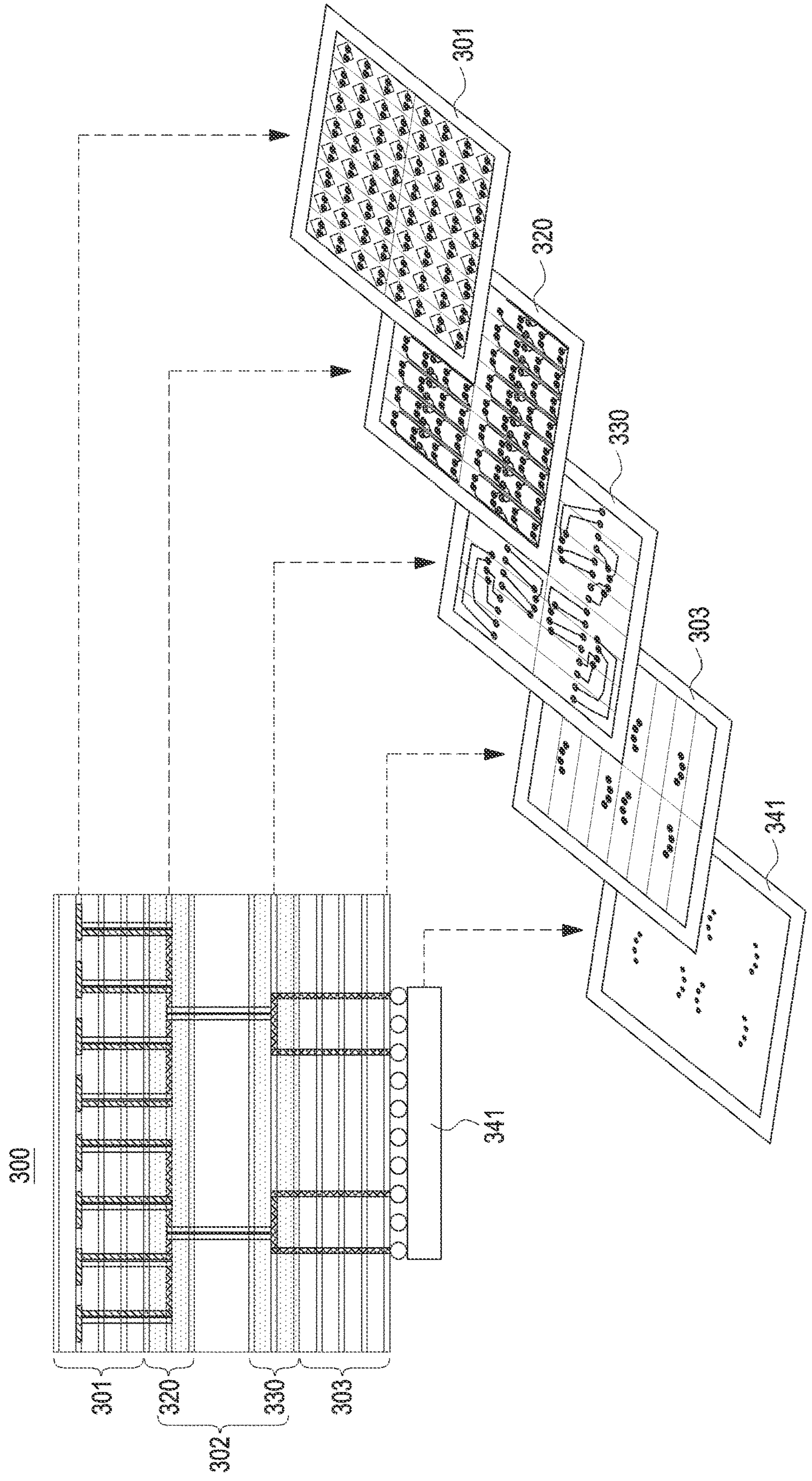
FIG. 6 is a schematic view of each layer and a sectional view of an antenna module disposed in an electronic device according to one of various embodiments disclosed herein.

FIG. 5 is a sectional view of an antenna module 300 disposed in an electronic device (e.g., the electronic device 101 in FIG. 1) according to one of various embodiments disclosed herein. FIG. 6 is a schematic view of each layer and a sectional view of an antenna module 300 disposed in an electronic device according to one of various embodiments disclosed herein.

According to various embodiments, an electronic device (e.g., the electronic device 101 of FIG. 1 to FIG. 4) may include an antenna module 300. The antenna module 300 may have an antenna in package applicable in an ultra-high frequency (e.g., a frequency in a terahertz band) and the "antenna in package" may mean a structure in which the communication circuit 341 and the antenna element(s) 301*a* are arranged in one package or on one printed circuit board.

According to various embodiments, antenna elements arranged on the antenna module 300 may be selectively combined to form a subarray (e.g., a subarray structure). According to an embodiment, groups (hereinafter, referred to as antenna part 301, network part 302, and communication circuit part 303) of respective layers constituting the antenna module 300 are designed to have independence from each other so as to minimize line loss and improve space efficiency through optimizing an internal structure of the module.

According to various embodiments, the antenna module 300 may include an antenna part 301 in which antenna elements 310*a* (e.g., conductive plates) forms a specified array and which is configured of multiple layers. In antenna module 300, a network part 302 and a communication circuit part 303 are stacked-up in a downward direction with reference to the antenna part 301. According to an embodiment, the network part 302 may include a feeding network part 320 and a routing part 330. According to an embodiment, the communication circuit part 303 may include a mounting part 340 and a connection part 350.

According to various embodiments, the antenna module 300 may be designed to have a high-density interconnect (HDI) PCB structure including multiple layers. For example, the antenna part 301, the feeding network part 320, the routing part 330, and the communication circuit part 303 each may have a form of a printed circuit board in which multiple layers are stacked up. In the embodiment described above, although it is described that the antenna module 300 includes a total of 14 layers but without limitation thereto, and design may be changed to various layers applicable in an ultra-high frequency.

According to various embodiments, the antenna part 301 may be designed to have a subarray structure including a specified arrangement (e.g., a subarray) of antenna elements 301*a*. The antenna elements 301*a* may be antenna radiators and may include, for example, a patch-type radiation conductor or a conductive plate type having a dipole structure extending in one direction. For another example, the patch-type antenna elements 301*a* may efficiently use a physical space of the antenna module 300 and provide a broadside radiation pattern and thus may be advantageous in a gain and beam steering.

Figure 7A:
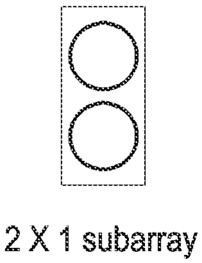
FIG. 7A, FIG. 7B, FIG. 7C, and FIG. 7D are views illustrating a subarray structure of antenna elements of an antenna module according to one of various embodiments disclosed herein.
Figure 7B:
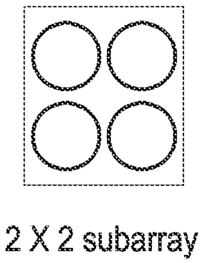
Figure 7C:
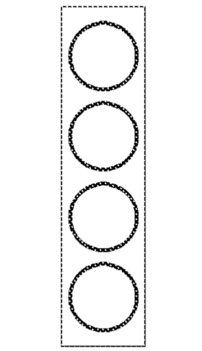
Figure 7D:
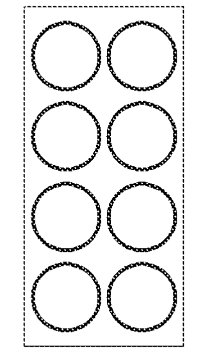

According to various embodiments, the antenna part 301 may include, based on a first layer 311 including a surface exposed to the outside, a second layer 312, a third layer 313, and the fourth layer 314. Main radiators (e.g., the first antenna elements 311*a*) to be connected to a feeding line of the feeding network part 320 may be positioned on the first layer 311 and designed to have a subarray structure. The number of radiators (e.g., the antenna elements 301*a*) arrangeable in the antenna module 300 may be determined according to a frequency band used, and a subarray structure may be variously designed according to the determined number of radiators. For example, the subarray structure may be variously arranged such as in an array of 2×1, 2×2, 4×1, or 4×2, based on the patch type (see FIGS. 7A, 7B, and 7C). For another example, the antenna elements 301*a* of the patch type may be one of various shapes such as a square, circle, rectangle, or oval. According to another embodiment, the arrangement and shape of the subarray structure may be determined according to requirements of the half power beamwidth and beam steering angle (beam scan range).

According to various embodiments, sub radiators (e.g., second antenna elements 312*a*) may be arranged on the second layer 312 to correspond to the first antenna elements 311*a*. The second antenna elements 312*a* may have a form of a patch type and may gain antenna-related additional gain or serve as radiators for phase change. According to an embodiment, when the first antenna elements 311*a* are expressed as a top patch, the second antenna elements 312*a* may be expressed as a bottom patch or coupling stacked patch. In another embodiment, the second antenna elements 312*a* may have different characteristics depending on a patch type, may be expressed as a meta-surface when designed to have an artificial change that is not normal physical laws, and may change a shape by using an active element.

According to various embodiments, the third layer 313 may include a high impedance surface (HIS) structure 313*a* and the fourth layer 314 may provide a ground surface 314*a*. The HIS structure 313*a* may be provided as a structure for reducing a surface current between antennas by separating a ground layer under antenna elements of a patch type to compensate for the performance degradation caused by beam steering. Generally, the arrangement of antenna elements of a patch type may have degraded performance by interference between adjacent antenna elements during beam steering. Accordingly, arrangement of a periodic ground plane on a layer on which antenna elements are arranged and a different layer may prevent performance degradation during beam steering. According to an embodiment, in case of the antenna module 300 using an ultra-high frequency, the HIS structure 313*a* may be designed in the antenna module 300 because of the very short wavelength.

According to various embodiments, the network part 302 may be disposed under the antenna part 301 and including multiple layers. The network part 302 may include transmission lines for electrically connecting a transmission signal and/or a reception signal transferred from the communication circuit (e.g., an RFIC) 341 toward the antenna elements 301*a* of the antenna part 301. According to an embodiment, in the network part 302, the feeding network part 320 adjacent to the antenna part 301 and the routing part 330 adjacent to the communication part 303 may be stacked. The antenna module 300 for an ultra-high frequency may cause an increase in degree of integration of transmission lines due to insufficiency of physical spaces, and for designing with accordance to this, the network part 302 may be designed to have two separate stacked groups (each group is composed of multiple layers). For example, the optimal path for minimum loss and maximum efficiency may be designed by separating functions of groups as one group is used as the feeding network part 320 and the other group is used as the routing part 330, identifying the spatial topology analyzed in consideration of a position of a transmission signal and/or a reception transmission line (e.g., a bump map) supplied by the communication part 341 and a feeding position of antenna elements 301*a* forming a subarray structure, and optimizing the adjacency and connectivity between each layer.

According to various embodiments, the feeding network part 320 of the network part 302 may include multiple layers and may transfer a signal transferred from the communication circuit 341 to the antenna elements 301*a* (or feeding lines connected to the antenna elements 301*a*) of the antenna part 301 by using a first transmission line 315 (e.g., a branch structure transmission line) having a form of a power divider. The antenna elements 301*a* forming the subarray structure may maximize the performance thereof when each supplied with the same input power and phase value, and to this end, the first transmission line 315 of the feeding network part 320 may be variously designed. For example, the first transmission line 315 structure of the feeding network part 320 may be designed as at least one of a corporate feeding type, a series feeding type, and a hybrid feeding type.

According to an embodiment, in case of the corporate feeding type, signals input to each of the antenna elements 301*a* may be provided with the same intensity and the same phase. Since the corporate feeding type has an input signal disposed adjacent to the center of the subarray structure and has a two-stage branch structure, designing in consideration of a space occupied by a transmission line structure may be required. According to another embodiment, the series feeding type may provide high space utilization due to a simple structure. The series feeding type may require a design that does not vary in strength and phase between antenna elements, considering that an input signal is disposed at one side of the subarray structure. According to still another embodiment, the hybrid feeding type has performance and structural limitations intermediate to those of the corporate feeding type and the series feeding type and may require a design considering this. According to an embodiment, the transmission line structure of the feeding network part 320 may be variously changed in design according to feeding of the subarray structure, process design parameters considering of arrangement shapes of antenna elements, and connectivity with the communication circuit, etc.

According to an embodiment, the first transmission line 315 of the feeding network part 320 may form a strip type transmission line branched from a first point P1 connected to the routing part 330 as a starting point into multiple second points P2 facing positions of multiple first antenna elements, respectively. The first transmission line 315 may include one strip transmission line extending from the first point P1 and multiple strip transmission lines branched from the one strip transmission line and extending to the second points P2. According to an embodiment, the first point P1 of the first transmission line 315 and the multiple second points P2 may be arranged on the same layer or on different layers.

According to an embodiment, the first transmission line 315 of the feeding network part 320 may include a (1-1)th transmission line 315*a* electrically connected to a Tx terminal of the communication circuit 341 (e.g., an ultra-high frequency circuit chip (radio frequency integrated chip (RFIC)) and a (1-2)th transmission line 315*b* electrically connected to an Rx terminal of the communication circuit 341. According to an embodiment, the (1-1)th transmission line 315*a* and the (1-2)th transmission line 315*b* may be arranged on the same layer or on different layers.

Figure 23:
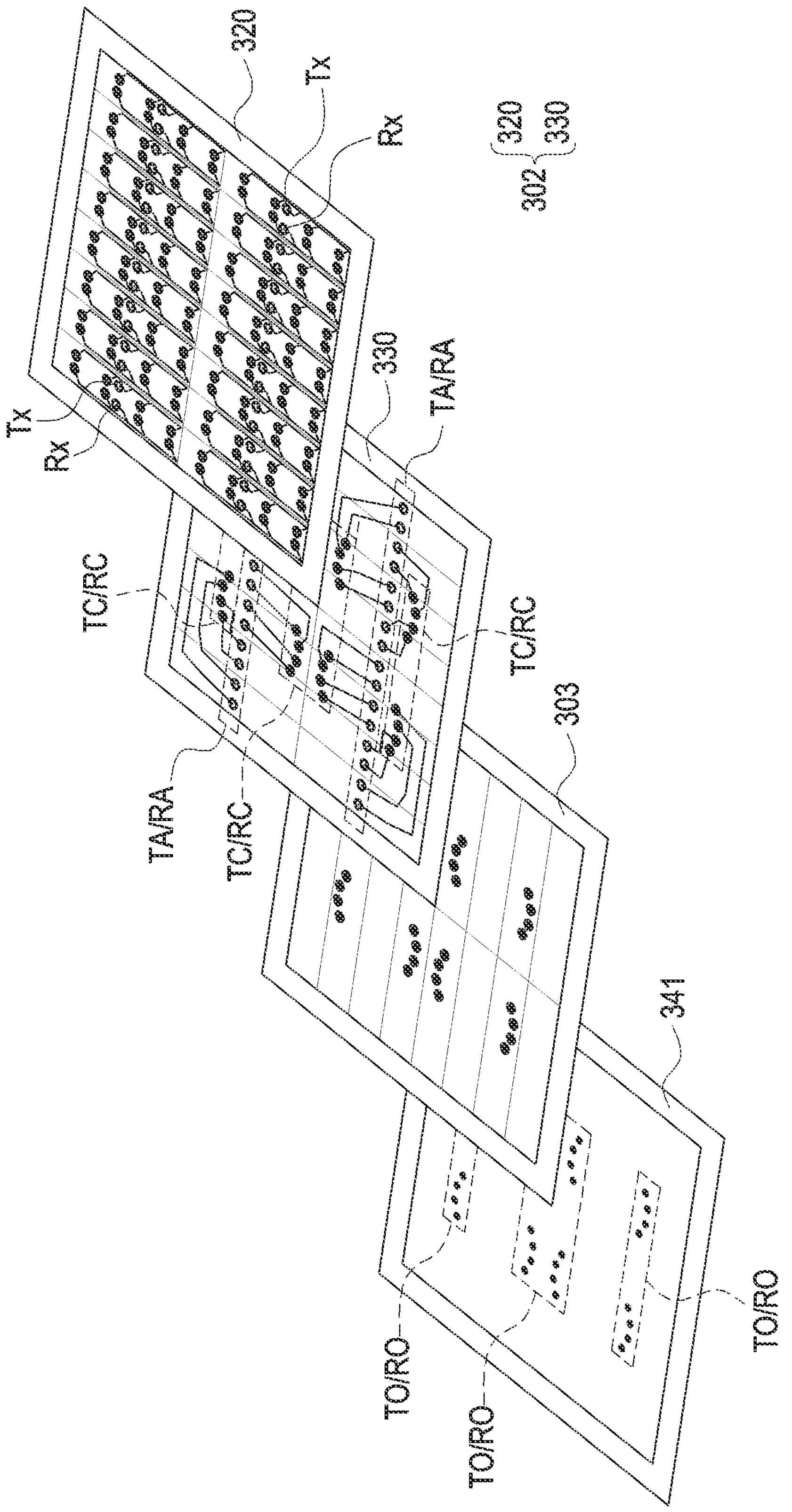
FIG. 23 is a view illustrating a network part including the routing part in FIG. 22 in an antenna module according to various embodiments disclosed herein.

According to various embodiments, the routing part 330 of the network part 302 may include multiple layers and may connect an output position (e.g., the output terminals TO/RO in FIG. 23) of the communication circuit 341 and an input position (e.g., transmission terminals Txs and reception terminals Rxs in FIG. 23) of the feeding network parts 320. For example, the routing part 330 may include a second transmission line 316 of a strip type and a second via 318 so that a signal provided from the communication circuit 341 is provided to the feeding network part 320 via the routing part 330. The second transmission line 316 of the routing part 330 may extend from a third point P3 connected to the first via 317 of the communication circuit part 303 as a starting point toward a fourth point P4 facing the first point P1 of the feeding network part 320. According to an embodiment, the second via 318 of the routing part 330 is a through-via for transferring a signal and may extend through a core layer formed between the feeding network part 320 and the routing part 330 to connect a first point (e.g., transmission input terminals Txs and reception input terminals Rxs in FIG. 23) of the feeding network part 320 and a fourth point (e.g., transmission/reception ports (TAs/RAs) in FIG. 23) of the routing part 330. In some embodiments, the core layer may be understood to be included in one of the network part 320 or the routing part 330 and may be used as a structure to provide strength to the antenna module 300.

According to an embodiment, the position of the communication circuit 341 positioned on the lower surface of the antenna module 300 and the position of the antenna elements 301*a* of the subarray structure positioned on the upper surface of the antenna module may have fixed values, and the output position (e.g., a second point P2) of the first transmission line 315 of the feeding network part 320 connected to the antenna elements 301*a* may have a fixed value. The feeding network part 320 may be formed to be transmission line in a power splitter form, and thus the routing part 330 may be formed to have an optimal path connecting two points in consideration of an input position (e.g., first point P1) of the first transmission line 315 of the feeding network part 320 and an output position (e.g., position of Tx terminal/Rx terminal of communication circuit 341) of the communication circuit 341.

According to an embodiment, a connection point between the second transmission line 316 and the second via 318 within the routing part 330 may include a matching structure. For example, the matching structure may be designed in the shape of at least one of an impedance transformer line, an open stub, or a short stub for transmission line matching. The spatial limitations of the antenna module 300 for an ultra-high frequency band may be overcome by designing the matching structure in the routing part 330 providing a space and function separated from the feeding network part 320.

According to various embodiments, the communication circuit part 303 may be positioned under the network part 302 and may include a mounting part 340 and a connection part 350. According to various embodiments, the network part 340 may be disposed under the routing part 330 and may include multiple layers. The mounting part 340 may have the communication circuit 341 mounted on the lower surface thereof and may be designed to connect transmission and/or reception output of the communication circuit 341 to an input of the network part 302. For example, the mounting part 340 may include multiple first vias 317 to supply a transmission and/or reception output of the communication circuit 341 to the routing part 330, and the multiple first vias 317 may be designed to pass through multiple conduction layers (and dielectric layers) respectively. According to an embodiment, the mounting part 340 may include only a via (e.g., the first via 317) without a transmission line.

According to an embodiment, the mounting part 340 may include an RF signal line for transmitting or receiving an RF signal of the communication circuit 341, a line for inputting or outputting an IF signal used in the communication circuit 341, a line for inputting and outputting of a logic circuit, a line for a control signal, and/or power/ground lines. In some embodiments, the thickness (e.g., the number of layers) of the mounting part 340 may be designed to correspond to the number of input and output signals of the communication circuit 341.

According to various embodiments, the connection part 350 may be disposed under the mounting part 340 and may include multiple layers. The connection part 350 may include a ball grid array (BGA) 351 and a molding structure 352 to electrically connect the communication circuit 341 and a control, power, or IF signal provided from the communication circuit 341 to a main circuit board. According to an embodiment, the connection part 350 may further include a copper block for heat dissipation of the antenna module 300 and a connection structure to the main circuit board.

Figure 8A:
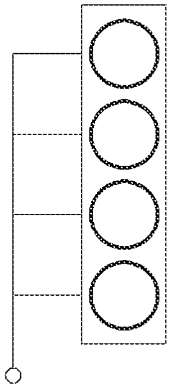
FIG. 8A, FIG. 8B, and FIG. 8C are views schematically illustrating a feeding configuration for a subarray structure of an antenna module according to another one of various embodiments disclosed herein.
Figure 8B:
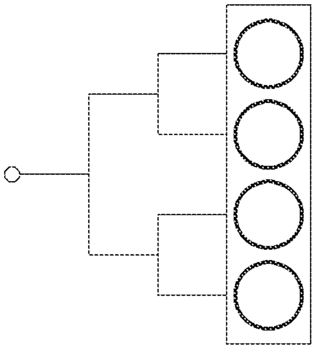
Figure 8C:
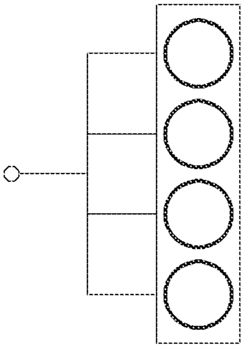

FIG. 7A, FIG. 7B, FIG. 7C, and FIG. 7D are views illustrating a subarray structure of antenna elements of an antenna module according to one of various embodiments disclosed herein. FIG. 8A, FIG. 8B, and FIG. 8C are views schematically illustrating a feeding configuration for a subarray structure of an antenna module according to another one of various embodiments disclosed herein.

According to various embodiments, an electronic device (e.g., electronic device 101 of FIGS. 1 to 4) may include an antenna module (e.g., antenna module 300 of FIGS. 5 and 6). The antenna module 300 may have an antenna in package structure applicable to an ultrahigh frequency and antenna elements disposed on the antenna module 300 may form a subarray. Groups of respective layers constituting the antenna module 300 are designed to have independence from each other so as to minimize line loss and improve space efficiency through optimizing an internal structure of the module.

The subarray structure in FIGS. 7A, 7B, 7C, and 7D and the feeding configuration in FIGS. 8A, 8B, and 8C may entirely or partially identical to the subarray structure of the antenna part 301 and the configuration of the feeding network part 320 in FIGS. 5 and 6, respectively.

According to various embodiments, the antenna module 300 may include an antenna part (e.g., the antenna part 301 in FIGS. 5 and 6), and the antenna part 301 may be designed to have a subarray structure for forming a subarray by combining multiple antenna elements (e.g., conductive plates). Referring to FIGS. 7A, 7B, 7C, and 7D, antenna elements of a patch type in each subarray structure may be arranged as 2×1, 2×2, 4×1, and 4×2.

According to various embodiments, a feeding network part (e.g., the feeding network part 320 in FIGS. 5 and 6) stacked on the antenna part 301 may provide a signal transmission line array for maximizing (e.g., providing the same input power and the same phase value to each antenna) performance of each antenna including the subarray structure.

FIG. 8A illustrates a structure in which a signal provided from a communication circuit (e.g., the communication circuit 341 in FIGS. 5 and 6) is connected to an antenna element (e.g., the antenna element 301*a* in FIG. 5A) via a series feeding type transmission line in case that a subarray antenna structure is 4×1. An input terminal is disposed on one side of the subarray antenna structure and a transmission line branched into four from the input terminal may be connected to each antenna element.

FIG. 8B illustrates a structure in which a signal provided from the communication circuit 341 is connected to the antenna element via a corporate feeding type transmission line in case that the subarray antenna structure is 4×1. The input terminal is disposed adjacent to the central area of the subarray antenna structure, and it may have a two-stage branch structure in which a transmission line branched into two from the input terminal each forms two branched transmission lines. The transmission lines branched into four in total may be connected to antenna elements, respectively.

FIG. 8C illustrates a structure in which a signal provided from the communication circuit 341 is connected to the antenna element via a hybrid feeding type transmission line in case that the subarray antenna structure is 4×1. An input terminal is disposed adjacent to the central area of the subarray antenna structure and a transmission line branched into four from the input terminal may be connected to each antenna element. The characteristics of the corporate feeding type, the series feeding type, and the hybrid feeding type may refer to the above description of FIGS. 5 and 6.

Figure 9:
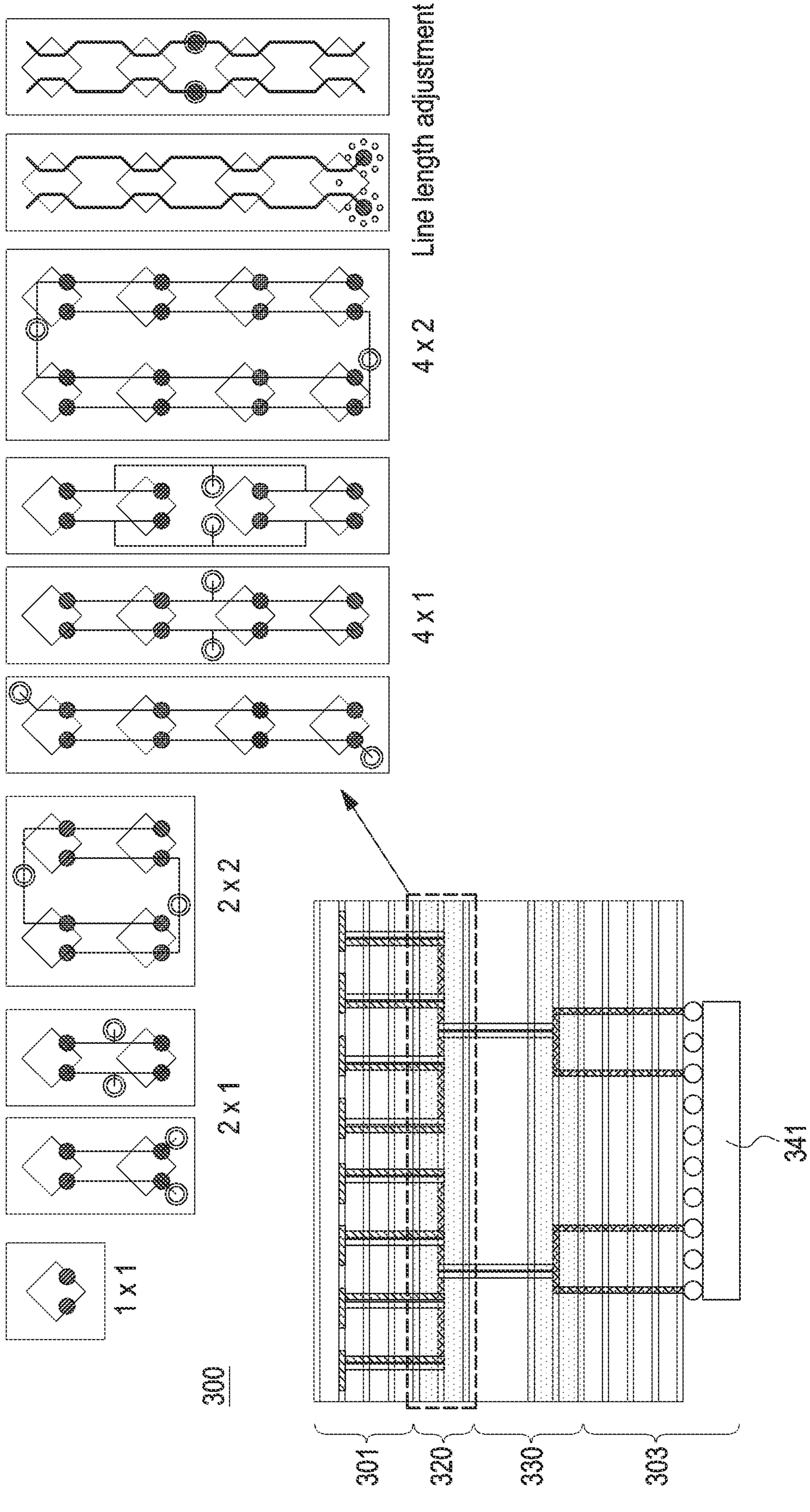
FIG. 9 is a view illustrating a feeding network structure in a feeding network part connected to antenna elements of an antenna module according to one of various embodiments disclosed herein.

FIG. 9 is a view illustrating a feeding network structure in a feeding network part connected to antenna elements of an antenna module according to one of various embodiments disclosed herein.

According to various embodiments, an electronic device (e.g., the electronic device 101 of FIGS. 1 to 4) may include an antenna module 300. The antenna module 300 may have an antenna in package structure applicable to an ultrahigh frequency and antenna elements disposed on the antenna module 300 may form a subarray. Groups of respective layers constituting the antenna module 300 are designed to have independence from each other so as to minimize line loss and improve space efficiency through optimizing an internal structure of the module.

According to various embodiments, in the antenna module 300, based on the antenna part 301 in which the subarray structure is formed, the feeding network part 320, the routing part 330, and the communication circuit part 303 may be consecutively stacked. Each of the antenna part 301, the feeding network part 320, the routing part 330, and the communication circuit part 303 may include multiple layers.

The subarray structure and the feeding configuration in FIG. 9 may entirely or partially identical to the subarray structure of the antenna part 301 and the configuration of the feeding network part 320 in FIGS. 5 and 6.

According to various embodiments, in order to provide a signal from the communication circuit 341 to the antenna elements of the subarray structure, the feeding network part 320 may form various transmission line types corresponding to the subarray structure. A case where the transmission line type is designed in a single layer of the feeding network part 320 will be described. Each subarray structure may be variously arranged such as in an array of 1×1, 2×1, 2×2, 4×1, and 4×2, based on the patch type.

According to the embodiment disclosed herein, two 2×1 subarray structures are illustrated. For example, transmission lines branched from the input terminal positioned at one side of the subarray structure to each antenna element are disclosed. Two transmission lines may be provided and may be connected to a Tx terminal and an Rx terminal disposed in each antenna element. For another example, there is disclosed a transmission line branched from an input terminal disposed nearby the center (e.g., between antenna elements) of the subarray structure to each antenna element. Two transmission lines may be provided and may be connected to a Tx terminal and an Rx terminal disposed in each antenna element.

According to the embodiment disclosed herein, one 2×2 subarray structures is illustrated. For example, there is disclosed a transmission line branched from an input terminal disposed nearby the center (e.g., between antenna elements) of the subarray structure to each antenna element. Two transmission lines may be provided and may be connected to a Tx terminal and an Rx terminal disposed in each antenna element.

According to the embodiment disclosed herein, three 4×1 subarray structures are illustrated. For example, transmission lines branched from the input terminal positioned at one side of the subarray structure to each antenna element are disclosed. Two transmission lines may be provided and may be connected to a Tx terminal and an Rx terminal disposed in each antenna element. For another example, there is disclosed a transmission line branched from an input terminal disposed nearby the center (e.g., between antenna elements) of the subarray structure to each antenna element. Two transmission lines may be provided and may be connected to a Tx terminal and an Rx terminal disposed in each antenna element. For another example, a transmission line branched into two lines from an input terminal disposed nearby the center (e.g., between antenna elements) of the subarray structure may be connected to each antenna element. Two transmission lines may be provided and may be connected to a Tx terminal and an Rx terminal disposed in each antenna element.

According to the embodiment disclosed herein, one 4×2 subarray structures is illustrated. For example, transmission lines branched from the input terminal positioned at one side of the subarray structure to each antenna element are disclosed. Two transmission lines may be provided and may be connected to a Tx terminal and an Rx terminal disposed in each antenna element.

According to the embodiment disclosed herein, for the 4×1 subarray structure, the shape or length of the transmission line may be variously designed in consideration of the distance or relative positions between the input terminal and the antenna element (e.g., the Tx terminal and the Rx terminal disposed at each antenna element). For example, a phase difference or the like due to the relative positions of antenna elements may be compensated by using the shape or length of the transmission line. The type of the subarray structure and the arrangement configuration of the transmission line are not limited to the embodiment disclosed herein and may be variously changed in design considering the number and arrangement relationship of antenna elements of the subarray structure and the area of a feeding network layer to improve antenna performance.

Figure 10:
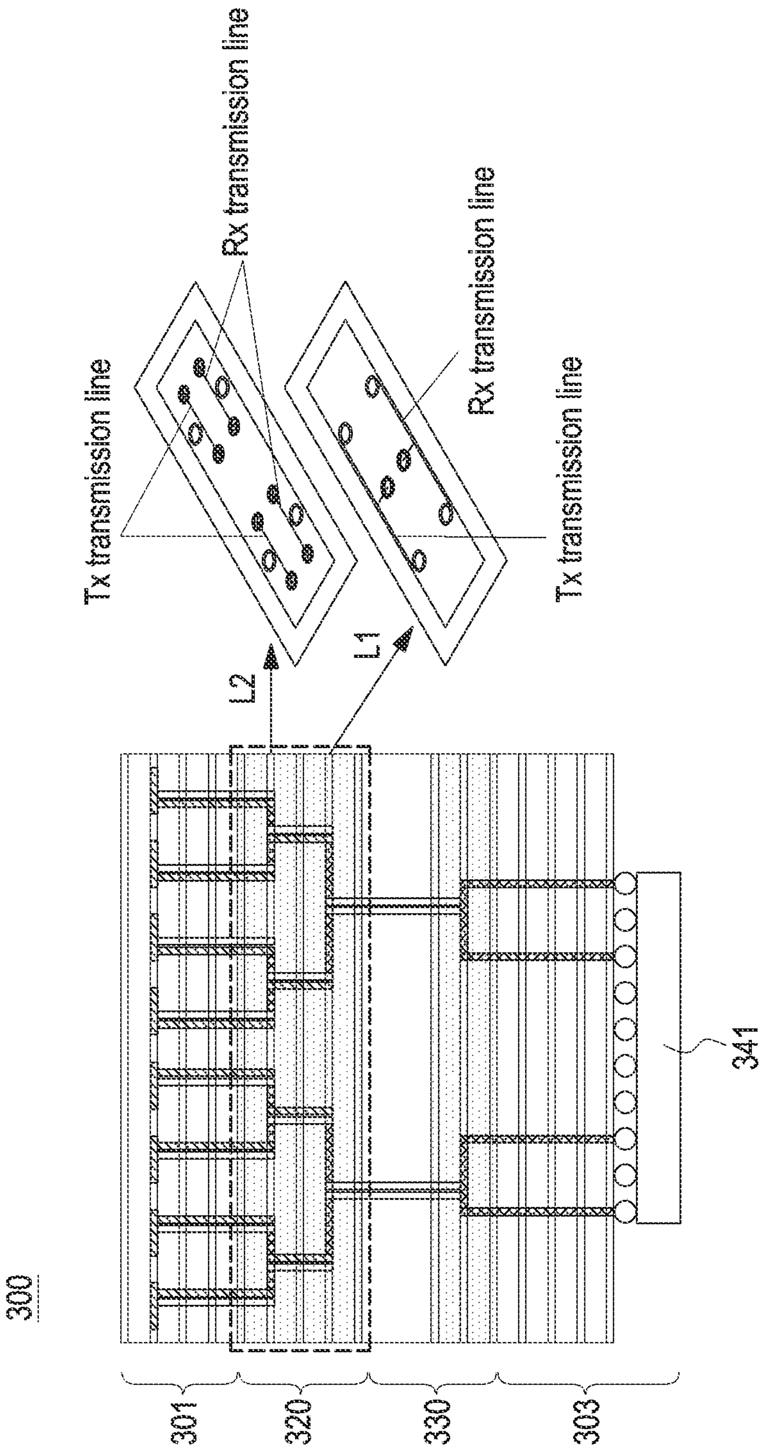
FIG. 10 is a view illustrating a transmission line structure in a feeding network part connected to antenna elements of an antenna module according to another one of various embodiments disclosed herein.
Figure 11:
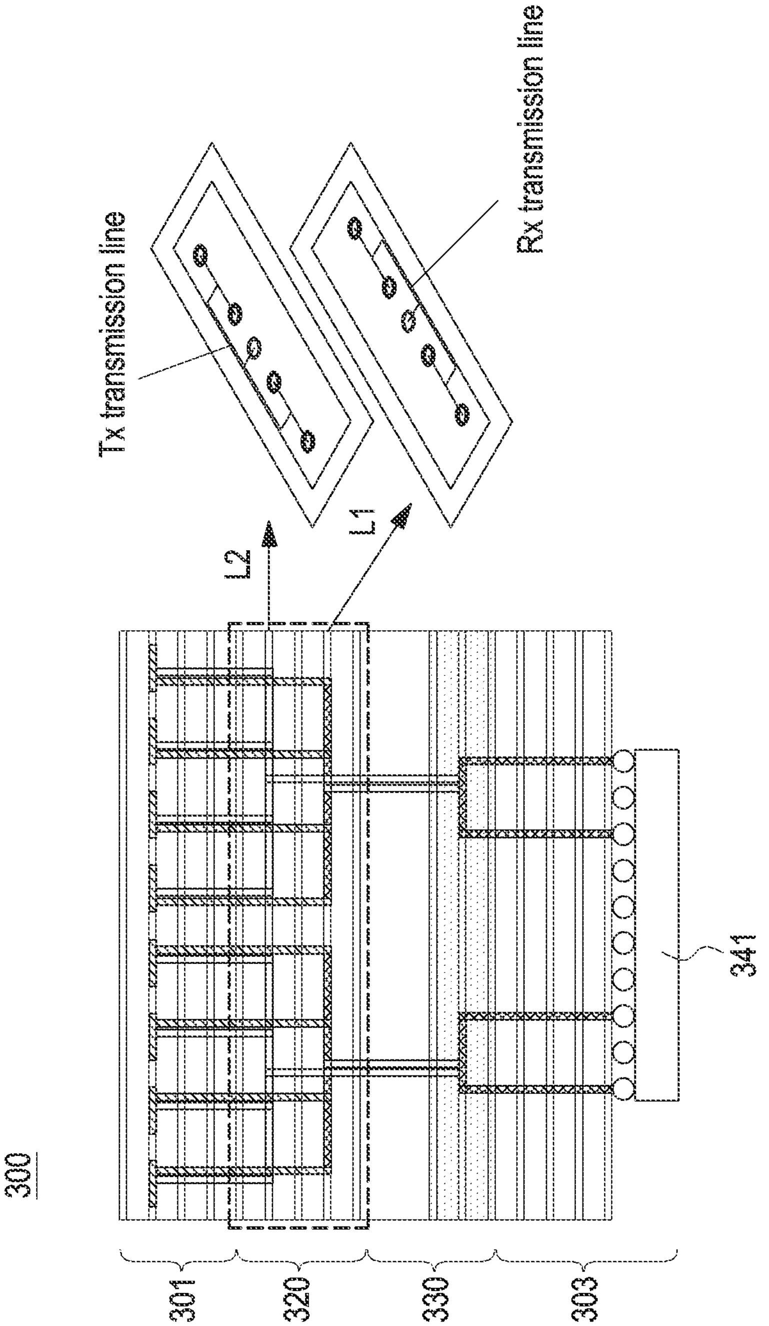
FIG. 11 is a view illustrating a transmission line structure in a feeding network part connected to antenna elements of an antenna module according to still another one of various embodiments disclosed herein.

FIG. 10 is a view illustrating a transmission line structure in a feeding network part connected to antenna elements of an antenna module according to one of various embodiments disclosed herein. FIG. 11 is a view illustrating a transmission line structure in a feeding network part connected to antenna elements of an antenna module according to another one of various embodiments disclosed herein.

According to various embodiments, an electronic device (e.g., the electronic device 101 of FIGS. 1 to 4) may include an antenna module 300. The antenna module 300 may have an antenna in package structure applicable to an ultrahigh frequency and an antenna disposed on the antenna module 300 may form a subarray.

According to various embodiments, in the antenna module 300, based on the antenna part 301 in which the subarray structure is formed, the feeding network part 320, the routing part 330, and the communication circuit part 303 may be consecutively stacked. Each of the antenna part 301, the feeding network part 320, the routing part 330, and the communication circuit part 303 may include multiple layers. According to various embodiments, in order to provide a signal from the communication circuit 341 to the antenna elements of the subarray structure, the feeding network part 320 may form various transmission line types corresponding to the subarray structure.

The subarray structure and the feeding configuration in FIGS. 10 and 11 may entirely or partially identical to the subarray structure of the antenna part 301 and the configuration of the feeding network part 320 in FIGS. 5 and 6.

Referring to FIG. 10 according to an embodiment, with reference to the 4×1 subarray structure, a transmission line may be designed to extend in multiple layers of the feeding network part 320 so as to electrically transfer a Tx signal from the communication circuit 341 to the antenna elements. The transmission line may be primarily branched into two in a first layer L1. Each transmission line having been branched into two may be branched into two again in a second layer L2 disposed on the first layer L1.

According to another embodiment, with reference to the 4×1 subarray structure, a transmission line may be designed to extend in multiple layers of the feeding network part 320 so as to electrically transfer an Rx signal from the communication circuit 341 to the antenna elements. The transmission line may be primarily branched into two in a first layer L1. Each transmission line having been branched into two may be branched into two again in a second layer L2 stacked on the first layer L1.

According to an embodiment, a separate layer may be disposed between the first layer L1 and the second layer L2. According to an embodiment, at least one via may be formed to connect the transmission line formed on the first layer L1 and the transmission line formed on the second layer L2.

Referring to FIG. 11 according to an embodiment, with reference to the 4×1 subarray structure, a transmission line may be designed to extend in multiple layers of the feeding network part 320 so as to electrically transfer a Tx/Rx signal from the communication circuit 341 to the antenna elements. Compared to FIG. 10, the Rx signal may pass through a branched strip type transmission line formed on the first layer L1 and then may be respectively provided to antenna elements forming the 4×1 subarray structure. The Tx signal may pass through a branched strip type transmission line formed on the second layer L2 disposed on the first layer L1 and then may be respectively provided to antenna elements forming the 4×1 subarray structure. However, the transmission line for the Rx signal is not limited to the structure disposed on the first layer L1 and the transmission line for the Tx signal is not limited to the structure disposed on the second layer L2, and the transmission line for the Rx signal may be disposed on the second layer L2 and the transmission line for the Tx signal may be disposed on the first layer L1, or the design may be changed to various structure such as a structure in which transmission lines are divided and arranged on multiple layers of three or more layers.

Figure 12A:
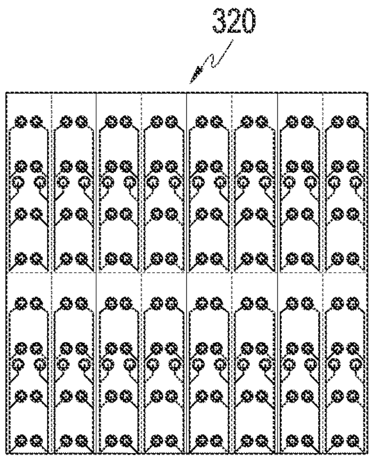
FIG. 12A, FIG. 12B, and FIG. 12C are views illustrating a transmission line network structure in a feeding network part to be connected to antenna elements of an antenna module according to one of various embodiments disclosed herein.
Figure 12B:
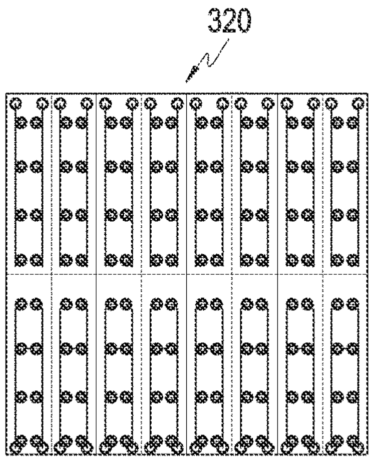
Figure 12C:
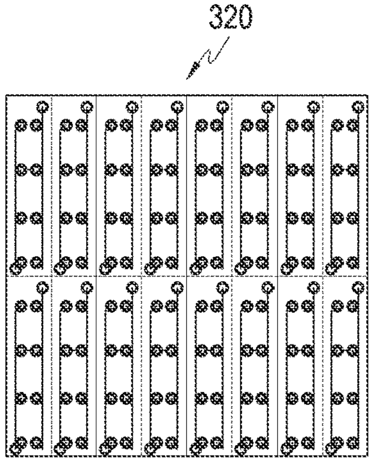

FIG. 12A, FIG. 12B, and FIG. 12C are views illustrating a transmission line network structure in a feeding network part to be connected to antenna elements of an antenna module according to one of various embodiments disclosed herein.

According to various embodiments, an electronic device (e.g., electronic device 101 of FIGS. 1 to 4) may include an antenna module (e.g., antenna module 300 of FIGS. 5 and 6). The antenna module 300 may have an antenna in package structure applicable to an ultrahigh frequency and an antenna disposed on the antenna module 300 may form a subarray.

According to various embodiments, in order to provide a signal from a communication circuit (e.g., the communication circuit 341 in FIGS. 5 and 6) to the antenna elements of the subarray structure, the feeding network part 320 may form various transmission line types corresponding to the subarray structure.

According to an embodiment disclosed herein, one subarray structure of the antenna module 300 may be formed in a 4×1 array based on the patch type, and a total of 16 subarray structures may be arranged in 8×2 columns on one surface (e.g., the upper surface) of the antenna module 300. According to an embodiment, one layer of the feeding network part 320 may include an input terminal and an output terminal to transmit and/or receive the Tx signal and an input terminal and an output terminal to transmit and/or receive the Rx signal. FIG. 12A illustrates a single layer in which the hybrid feeding type is designed, and FIGS. 12B and 12C illustrate a single layer in which the series feeding type is designed. The aforementioned description may be applied to a detailed description of each layer.

Figure 13A:
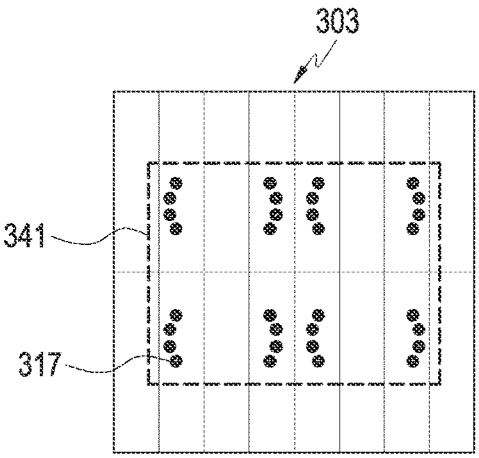
FIG. 13A, FIG. 13B, and FIG. 13C are views illustrating a structure of vias and transmission lines designed on each layer of an antenna module according to one of various embodiments disclosed herein.
Figure 13B:
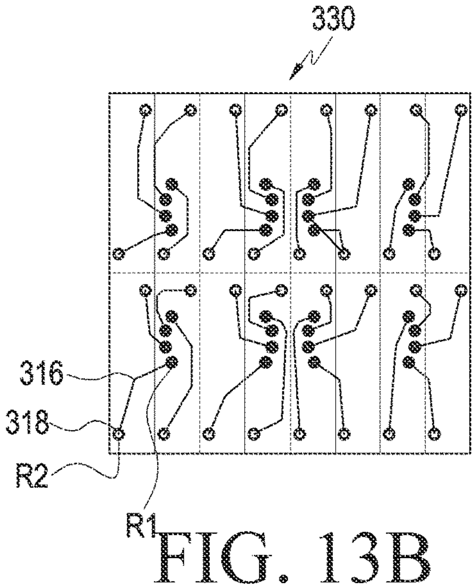
Figure 13C:
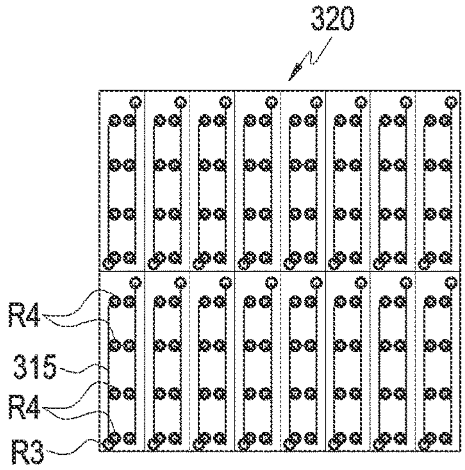

FIG. 13A, FIG. 13B, and FIG. 13C are views illustrating a structure of vias and transmission lines designed on each layer of an antenna module according to one of various embodiments disclosed herein.

According to various embodiments, an electronic device (e.g., electronic device 101 of FIGS. 1 to 4) may include an antenna module (e.g., antenna module 300 of FIGS. 5 and 6). The antenna module 300 may have an antenna in package structure applicable to an ultrahigh frequency and an antenna disposed on the antenna module 300 may form a subarray.

According to various embodiments, in the antenna module 300, based on an antenna part (e.g., the antenna part 301 in FIGS. 5 and 6) in which the subarray structure is formed, the feeding network part 320, the routing part 330, and the communication circuit part 303 may be consecutively stacked. According to an embodiment, in order to provide a signal from the communication circuit 341 to the antenna elements of the subarray structure, the communication circuit part 303, the routing part 330, and the feeding network part 320 may form various transmission line types corresponding to the subarray structure.

The configuration of the transmission line in FIGS. 13A, 13B, and 13C may be entirely or partially identical to the configuration of the transmission line of the antenna module 300 in FIGS. 5 and 6.

Referring to FIG. 13A, the communication circuit part 303 may include first vias 317 corresponding to output positions (e.g., Tx/Rx output terminals) of the communication circuit 341. As the size of the communication circuit 341 is fixed and the communication circuit 341 is disposed in the center area of the communication circuit part 303, the first vias 317 may be designed near the center area of the communication circuit part 303.

Referring to FIG. 13B, a first point R1 corresponding to one first via 317 corresponding to an output position of the communication circuit 341 and a second point R2 corresponding to an input position of the network part 320 may be designed in the routing part 330, and the first point R1 and the second point R2 (e.g., the third point P3 and the fourth point P4 in FIG. 5) may be connected through the strip type second transmission line 316. The second point R2 may be electrically connected to a third point R3 (e.g., the first point P1 in FIG. 5) of the feeding network part 320 through the second via 318. According to an embodiment, the first point R1, the second point R2, and the second transmission line 316 connecting the first point and the second point may be individually designed as many as the corresponding number of output terminals of the communication circuit 341.

According to an embodiment, the position of the input terminal of the feeding network part 320 may be a fixed structure according to the position of the output terminal of the communication circuit 341 and the arrangement of the antenna elements of the subarray structure. Accordingly, the shape of second transmission lines 316 of the routing part 330 may be variously designed so that paths between the fixed input terminal and output terminal are favorable to antenna performance. For example, in case that, in the routing part 330, the first point R1 (e.g., a configuration in a position corresponding to the output terminal of the communication circuit 341) is positioned at the center and the second point R2 (e.g., a configuration in a position corresponding to the input terminal of the feeding network part 320) is disposed at both ends (e.g., a Tx output terminal is disposed at one end and an Rx output terminal is disposed at the other end), based on one subarray structure, the second transmission lines 316 may be formed in a radial shape extending in a direction from the center toward the edge.

Referring to FIG. 13C, the feeding network part 320 may include, through one second via 318, the third point R3 connected to the second point R2 and the fourth point R4 disposed to face the antenna element of the subarray structure. In the feeding network part 320, the third point R3 and the fourth point R4 may be connected through the strip type first transmission line 315 and a single transmission line extending from the third point R3 may be branched according to the number of antenna elements corresponding to the subarray structure. For example, based on one subarray structure, the third point (e.g., Tx/Rx input terminal) R3 is disposed at both ends and the first transmission line 315 may respectively extend from the third point R3 toward an area corresponding to the position in which four antenna elements are arranged. The fourth point R4 may be electrically connected to input terminals of antenna elements through vias. According to an embodiment, the third point R3, the fourth point R4, and the first transmission line 315 connecting the third point and the fourth point may be individually designed as many as the corresponding number of output terminals of the communication circuit 341.

Figure 14A:
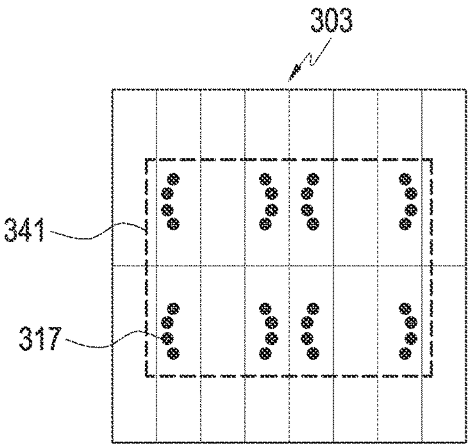
FIG. 14A, FIG. 14B, and FIG. 14C are views illustrating a structure of vias and transmission lines designed on each layer of an antenna module according to another one of various embodiments disclosed herein.
Figure 14B:
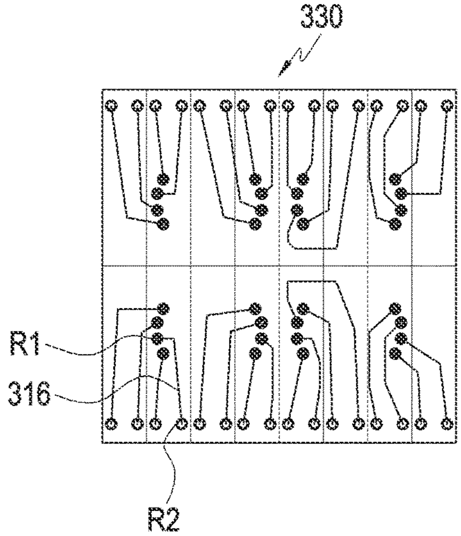
Figure 14C:
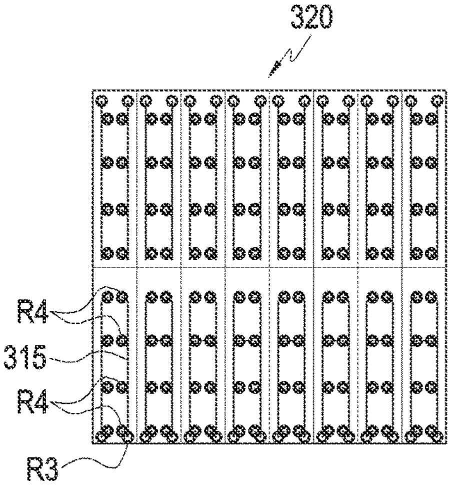

FIG. 14A, FIG. 14B, and FIG. 14C are views illustrating a structure of vias and transmission lines designed on each layer of an antenna module according to another one of various embodiments disclosed herein.

According to various embodiments, an electronic device (e.g., the electronic device 101 of FIGS. 1 to 4) may include an antenna module 300. The antenna module 300 may have an antenna in package structure applicable to an ultrahigh frequency and an antenna disposed on the antenna module 300 may form a subarray.

The structure of the feeding network part 320, the routing part 330, and the communication circuit part 303 in FIGS. 14A, 14B, and 14C may be entirely or partially identical to the structure of the feeding network part 320, the routing part 330, and the communication circuit part 303 in FIGS. 13A, 13B, and 13C. Hereinafter, a difference will be mainly described.

Referring to FIG. 14A, first vias 317 corresponding to output positions (e.g., Tx/Rx output terminals) of the communication circuit 341 may be designed in the communication circuit part 303. As the communication circuit 341 is fixed in size and disposed in the center area of the communication circuit part 303, the first vias 317 may be designed near the center area of the communication circuit part 303.

Referring to FIG. 14B, a first point R1 corresponding to one first via 317 corresponding to an output position of the communication circuit 341 and a second point R2 corresponding to an input position of the network part 320 may be designed in the routing part 330, and the first point R1 and the second point R2 may be connected through the strip type second transmission line 316.

According to an embodiment, in case that, in the routing part 330, the first point R1 (e.g., a configuration in a position corresponding to the output terminal of the communication circuit 341) is positioned at the center and the second point (e.g., a configuration in a position corresponding to the input terminal of the feeding network part 320) is disposed at one end (e.g., a Tx output terminal and an Rx output terminal are disposed at one end in parallel) based on one subarray structure, the second transmission lines 316 may be formed in a shape extending in a direction from the center toward the edge.

Referring to FIG. 14C, the feeding network part 320 may include the third point R3 connected to the second point R2 and the fourth point R4 disposed to face the antenna element of the subarray structure. In the feeding network part 320, the third point R3 and the fourth point R4 may be connected through the strip type first transmission line 315 and a single transmission line extending from the third point R3 may be branched according to the number of antenna elements corresponding to the subarray structure. For example, based on one subarray structure, the third point (e.g., Tx/Rx input terminal) R3 is disposed at one end and the first transmission line 315 may respectively extend from the third point R3 toward an area facing the position in which four antenna elements are arranged.

Figure 15A:
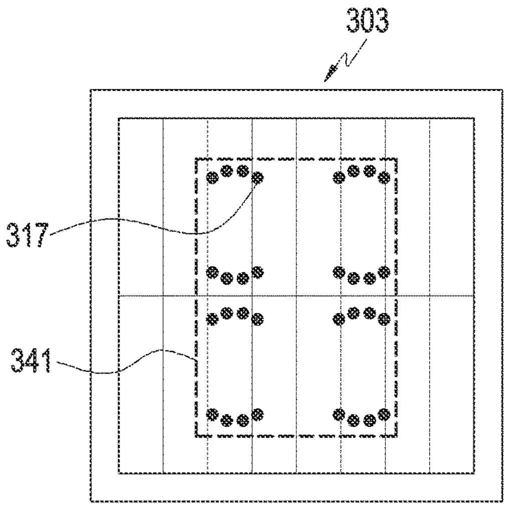
FIG. 15A, FIG. 15B, and FIG. 15C are views illustrating a structure of vias and transmission lines designed on each layer of an antenna module according to still another one of various embodiments disclosed herein.
Figure 15B:
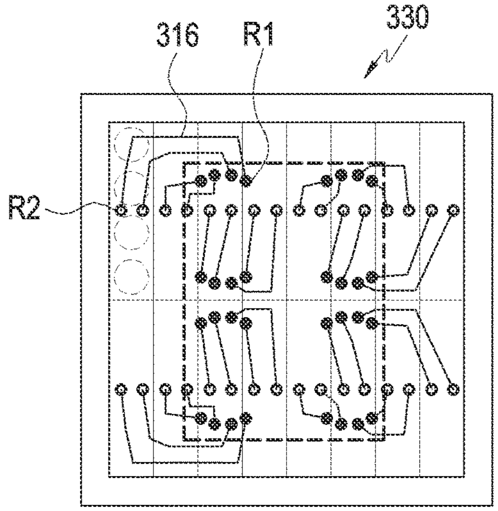
Figure 15C:
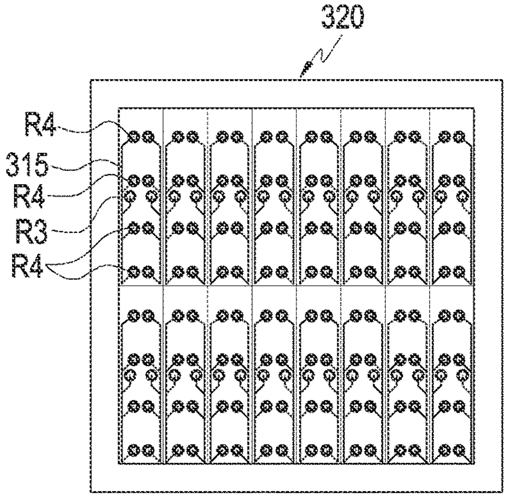

FIG. 15A, FIG. 15B, and FIG. 15C are views illustrating a structure of vias and transmission lines designed on each layer of an antenna module according to still another one of various embodiments disclosed herein.

According to various embodiments, an electronic device (e.g., the electronic device 101 of FIGS. 1 to 4) may include an antenna module 300. The antenna module 300 may have an antenna in package structure applicable to an ultrahigh frequency and an antenna disposed on the antenna module 300 may form a subarray.

The structure of the feeding network part 320, the routing part 330, and the communication circuit part 303 in FIGS. 15A, 15B, and 15C may be entirely or partially identical to the structure of the feeding network part 320, the routing part 330, and the communication circuit part 303 in FIGS. 13A, 13B, and 13C. Hereinafter, a difference will be mainly described.

Referring to FIG. 15A, first vias 317 corresponding to output positions (e.g., Tx/Rx output terminals) of the communication circuit 341 may be designed in the communication circuit part 303. As the communication circuit 341 is fixed in size and disposed in the center area of the communication circuit part 303, the first vias 317 may be designed near the center area of the communication circuit part 303. Compared to FIGS. 13*a* and 14A, the communication circuit 341 in FIG. 15A is rotated by 90 degrees, and the position of the output terminal may also be rotated by 90 degrees.

Referring to FIG. 15B, a first point R1 corresponding to one first via 317 corresponding to an output position of the communication circuit 341 and a second point R2 corresponding to an input position of the network part 320 may be designed in the routing part 330, and the first point R1 and the second point R2 may be connected through the strip type second transmission line 316.

According to an embodiment, in the routing part 330, the first point R1 (e.g., a configuration in a position corresponding to the output terminal of the communication circuit 341) may be positioned at the center and the second point (e.g., a configuration in a position corresponding to the input terminal of the feeding network part 320) may be disposed at the center area (e.g., a Tx output terminal and an Rx output terminal are disposed at one end in parallel), based on one subarray structure.

Referring to FIG. 15C, the feeding network part 320 may include the third point R3 connected to the second point R2 and the fourth point R4 disposed to face the antenna element of the subarray structure. In the feeding network part 320, the third point R3 and the fourth point R4 may be connected through the strip type first transmission line 315 and a single transmission line extending from the third point R3 may be branched according to the number of antenna elements corresponding to the subarray structure. For example, based on one subarray structure, the third point (e.g., Tx/Rx input terminal) R3 is disposed at the center area and the first transmission line 315 may respectively extend from the third point R3 toward an area facing the position in which four antenna elements are arranged.

FIG. 16 is a view simply illustrating a stacking structure of an antenna module according to various embodiments disclosed herein.

According to various embodiments, an electronic device (e.g., the electronic device 101 of FIGS. 1 to 4) may include an antenna module 300. The antenna module 300 may have an antenna in package structure applicable to an ultrahigh frequency and an antenna disposed on the antenna module 300 may form a subarray.

According to various embodiments, in the antenna module 300, based on the antenna part 301 in which the subarray structure is formed, the feeding network part 320, the routing part 330, and the communication circuit part 303 may be consecutively stacked. Each of the antenna part 301, the feeding network part 320, the routing part 330, and the communication circuit part 303 may include multiple layers.

According to various embodiments, PPG and a Cu layer are alternately disposed, the PPG may have a thickness of about 35 to 45 μm, and the Cu layer may have a thickness of 12 to 18 μm. For another example, the thickness of the PPG may be about 40 μm and the thickness of the Cu layer may be about 15 μm. According to an embodiment, a core layer supporting the antenna module may have a thickness of about 120 to 180 μm. For another example, assuming that the core layer has a thickness of 150 μm, the total thickness of the antenna module may be about 870 μm.

According to various embodiments, the antenna part 301 may include four layers, the feeding network part 320 may include three layers, the routing part 330 may include three layers, and the communication circuit part 303 may include four layers so that the antenna module may show a high-density interconnect (HDI) structure including a total of 14 layers. However, the embodiments illustrated herein is merely an example, and the core layer may be excluded by a designer, or the feeding network part and the routing part may be reduced to be five layers. For still another example, like extending the feeding network part to five layers instead of three, the design may be variously changed to improve the antenna performance.

According to an embodiment, the antenna part 301 may be disposed to be stacked in a total of four layers, for example, antenna elements may be arranged on a first layer exposed to the outside and a second layer positioned under the first layer, and a dummy HIS structure may be formed on a third layer and a fourth layer. The feeding network part 320 may be disposed to be stacked in a total of three layers and various feeding network structures may be designed on a sixth layer positioned in the middle. A fifth layer and a seventh layer stacked on and under the sixth layer may provide ground surfaces. The routing part 330 may be disposed to be stacked in a total of three layers and various transmission line structures may be designed on a ninth layer positioned in the middle. An eighth layer and a tenth layer stacked on and under the ninth layer may provide ground surfaces. A core layer may be positioned between the feeding network part 320 and the routing part 330. The core layer corresponds to a member capable of entirely supporting the antenna module 300 and may be positioned between the feeding network part 320 and the routing part 330. The communication circuit part 303 may be disposed to be stacked in a total of four layers, a communication circuit is disposed on a 11th layer, a 12th layer, and a 13th layer, and a 14th layer corresponding to the lower end may provide a ground surface.

According to various embodiments, an antenna module (e.g., the antenna module 300 described with reference to FIGS. 5 to 16) uses dual polarization orthogonal to each other to achieve twice the space efficiency theoretically compared to a single polarization antenna. According to various embodiments disclosed herein, it may be easy to implement dual polarization by combining multiple antenna modules 300. For example, dual polarization orthogonal to each other may be implemented by combining a pair of antenna modules 300 with the same polarization characteristics. Hereinafter, an example of implementing dual polarization by combining multiple (e.g., a pair) antenna modules 300 will be described.

Figure 17:
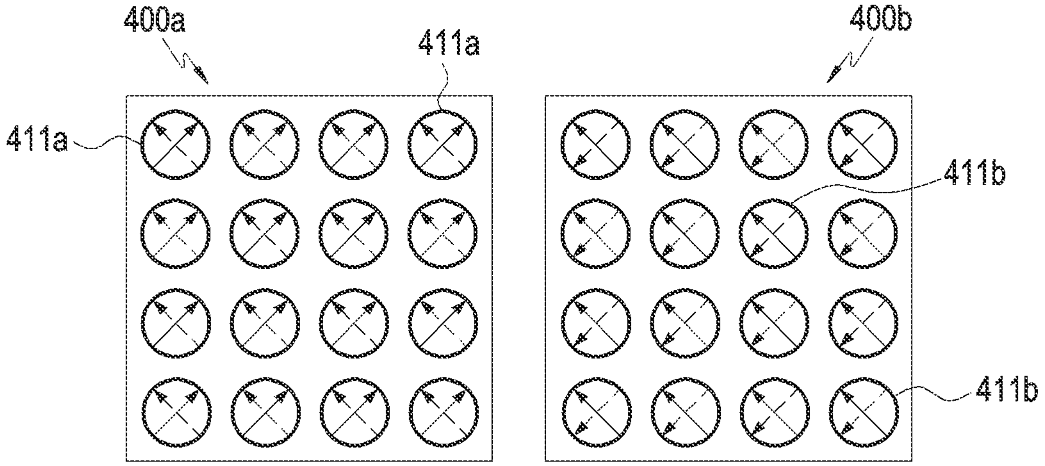
FIG. 17 is a view illustrating an embodiment of implementing double polarization by combining antenna modules according to various embodiments disclosed herein.

FIG. 17 is a view illustrating an embodiment of implementing double polarization by combining antenna modules 400*a* and 400*b* (e.g., the antenna module 300 described with reference to FIGS. 5 to 16) according to various embodiments disclosed herein.

In the embodiment described above, the antenna module 300 including the subarray structure is exemplified as an embodiment and in this embodiment, a description will be given for an example in which antenna modules 400*a* and 400*b* having no subarray structure are combined to implement dual polarization.

Referring to FIG. 17, in case that the antenna modules 400*a* and 400*b* having no subarray structure and generating polarization include antenna elements 411*a* and 411*b* (e.g., the antenna elements 301*a* in FIG. 5) in n×n array, disposition of a second antenna module 401*b* by rotating about 90 degrees with respect to a first antenna module 400*a* may allow the antenna modules 400*a* and 400*b* to generate dual polarization orthogonal to each other. Arrows shown in FIG. 17 illustrate a direction of polarization generated by each antenna element 411*a* or 411*b*. For example, in case that two antenna modules 400*a* and 400*b* have the same structure and the arrangement of the antenna elements 411*a* and 411*b* do not have directivity, dual polarization may be easily implemented by simply rotating and disposing the second antenna module 400*b* by 90 degrees with respect to the first antenna module 400*a*.

According to various embodiments, an antenna module implementing a subarray (subarrays) by combining multiple adjacent antenna elements 411*a* and 411*b* may reduce the number of phase shifters, thereby reducing the maximum beam steering angle, but obtaining a higher gain. Antenna elements forming a 2×1, 2×2, 4×1, and/or 4×2 array may be combined to form a subarray. Depending on arrangement of antenna elements of the subarray, there may be restrictions on implementing dual polarization by combining multiple antenna modules. The description thereof will the given below with reference to FIGS. 18 to 20.

Figure 18:
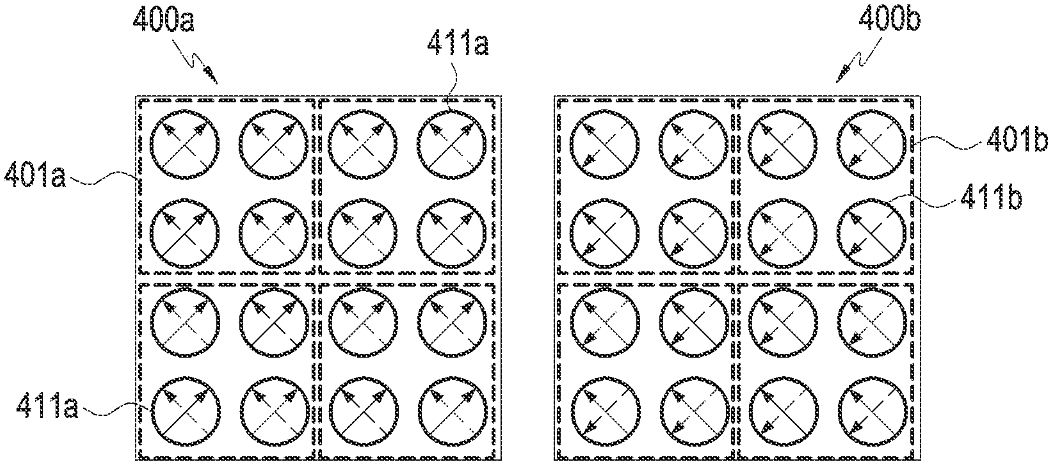
FIG. 18 is a view illustrating another embodiment of implementing double polarization by combining antenna modules according to various embodiments disclosed herein.

FIG. 18 is a view illustrating another embodiment of implementing double polarization by combining antenna modules 400*a* and 400*b* according to various embodiments disclosed herein.

Referring to FIG. 18, a structure is illustrated in which the first antenna module 400*a* and the second antenna module 400*b* include four subarrays 401*a* and 401*b* in which the antenna elements 411*a* and 411*b* form a 2×2 array and the subarrays 401*a* and 401*b* form a 2×2 array in the antenna modules 400*a* and 400*b*. For example, the arrangement of the antenna elements 411*a* and 411*b* may not have directivity within the subarrays 401*a* and 401*b* and the arrangement of subarrays 401*a* and 401*b* may not have directivity within each antenna module 400*a* or 400*b*. In this case, when disposed by rotating by about 90 degrees with respect to the first antenna module 400*a*, the second antenna module 400*b* may generate a vertical polarization with respect to the polarization generated by the first antenna module 400*a* (e.g., the subarrays 401*a* of the first antenna module 400*a*). For example, in FIG. 18, the subarray 401*a* in 1×1 position of the first antenna module 400*a* and the subarray 401*b* in 1×1 position of the second antenna module 400*b* may generate polarizations perpendicular to each other and the subarray 401*a* in 2×1 position of the first antenna module 400*a* and the subarray in 2×1 position of the second antenna module 400*b* generate polarization perpendicular to each other, so that the two antenna modules 400*a* and 400*b* may be combined to implement dual polarization. In the following detailed description, a subarray of two antenna modules disposed in the same row and column position may be referred to as "pairing subarrays".

Figure 19:
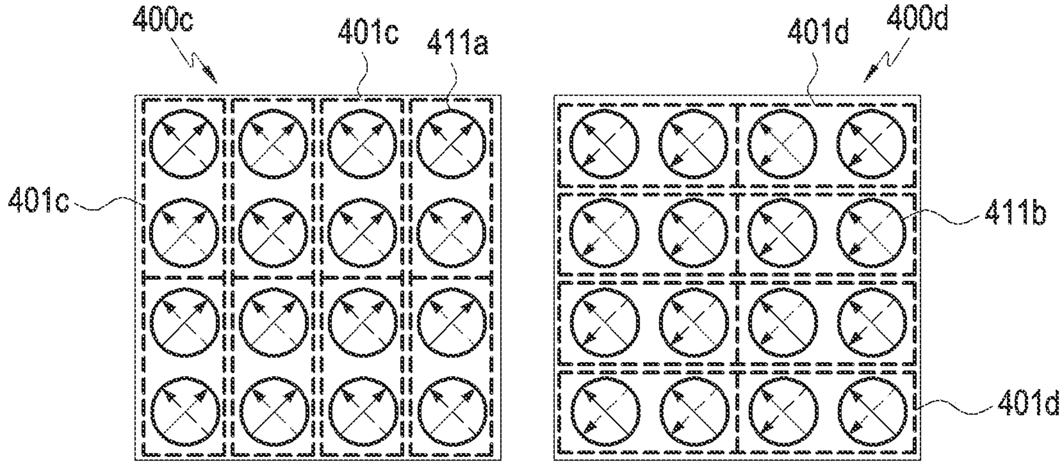
FIG. 19 is a view illustrating still another embodiment of implementing double polarization by combining antenna modules according to various embodiments disclosed herein.

FIG. 19 is a view illustrating still another embodiment of implementing double polarization by combining antenna modules 400*c* and 400*d* according to various embodiments disclosed herein.

According to various embodiments, in case that arrangement of antenna elements 411*a* and 411*b* has a directivity within the subarrays 401*c* and 401*d*, for example, form an n×m array ("n" and "m" are different natural numbers), it may be difficult to generate dual polarization with a combination of multiple antenna modules 400*c* and 400*d* only by disposing and rotating one of the antenna modules 400*c* and 400*c*. The antenna modules 400*c* and 400*d* in FIG. 19 may include eight subarrays 401*c* and 401*d* in which the antenna elements 411*a* and 411*b* form a 2×1 array and may have substantially the same structure. In an embodiment, based on the positions illustrated on the drawing, the subarrays 401*c* may form a 2×4 array in the first antenna module 400*c*, and the subarrays 401*d* may form a 4×2 array in the second antenna module 400*d* disposed by rotating by about 90 degrees compared to the first antenna module 400*c*. By way of example, although the antenna modules 400*c* and 400*d* have the same structure, in the position in which the second antenna module 400*d* is rotated by 90 degrees with respect to the first antenna module 400*d*, the arrangement of the subarrays 401*c* and 401*d* or the arrangement of the antenna elements 411*a* and 411*b* may be changed. For example, the antenna elements 411*a* of the subarray 401*c* are arranged in a vertical direction in the first antenna module 400*c* and the antenna elements 411*b* of the subarray 401*d* are arranged in a horizontal direction in the second antenna module 400*d*.

In case that the subarray 401*d* in 1×1 position of the first antenna module 400*c* and the subarray in 1×1 position of the second antenna module 401*d* are combined based on such arrangement of the antenna modules 400*c* and 400*d* and the alignment structure of the subarrays 401*c* and 401*d*, a beam steering direction or a steering range is different from each other, so it may be difficult to substantially implement double polarization by combining the two antenna modules 400*c* and 400*d* (e.g., the subarrays 401*c* and 401*d*). In some embodiments, the beam steering range may be generated due to the arrangement or a difference in spacing of the subarrays 401*c* and 401*d* in the two antenna modules 400*c* and 400*d*.

As such, in a structure in which arrangement of antenna elements of a subarray has directivity, it may be difficult to implement dual polarization by combining the same antenna modules while varying the arrangement direction or angle. In this case, dual polarization may be implemented by combining antenna modules designed to have different polarization characteristics of an antenna element or a subarray. However, it may require considerable time and cost to design two antenna modules having polarization characteristics orthogonal to each other. For example, it may require considerable time and cost to design or manufacture a transmission line or an impedance conversion line so that two antenna modules have polarization characteristics orthogonal to each other, and to verify the performance of the designed antenna module, etc. According to various embodiments disclosed herein, in a first antenna module 400*e* and a second antenna module 400*f*, antenna parts, feeding network part, and/or communication circuit parts (e.g., the antenna part 301, the feeding network part 320, and/or the communication circuit part 303 in FIG. 6) may be substantially identical to each other, and routing parts (e.g., the routing part 330 in FIG. 6) may rotate 180 degrees with respect to each other. For example, transmission/reception ports of a first subarray SA1 and a third subarray SA3 of FIG. 20 may be reversed, and the first subarray SA1 and the third subarray SA3 may be combined to generate dual polarizations orthogonal to each other. Accordingly, the antenna modules according to various embodiments disclosed herein may have substantially the same structure and easily implement vertical double polarization using subarrays having directivity. A description thereof will be given in detail with reference to FIG. 21.

Figure 20:
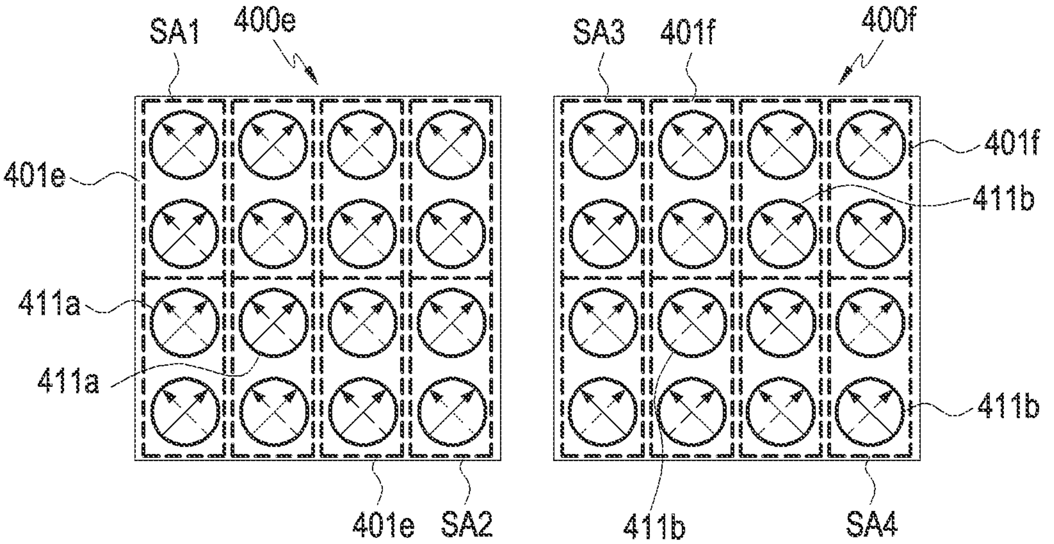
FIG. 20 is a view illustrating still another embodiment of implementing double polarization by combining antenna modules according to various embodiments disclosed herein.

FIG. 20 is a view illustrating still another embodiment of implementing double polarization by combining antenna modules 400*e* and 400*f* (e.g., the antenna module 300 in FIGS. 5 and/or 6) according to various embodiments disclosed herein.

Referring to FIG. 20, each of the first antenna module 400*e* and the second antenna module 400*f* may include subarrays 401*e* and 401*f* of a 2×4 array, and each of the subarrays 401*e* and 401*f* may include antenna elements 411*a* and 411*b* of a 2×1 array. In the first antenna module 400*e*, a subarray 401*e* (hereinafter, a "first subarray SA1") in 1×1 position and a subarray 401*e* (e.g., hereinafter, a "second subarray SA2") in 2×4 position may be arranged to be point symmetric to each other. For example, the antenna elements 411*a* of the first subarray SA1 may be arranged to be point symmetric to with the antenna elements 411*a* of the second subarray SA2, a transmission input terminal (e.g., a first transmission port TA1, which corresponds to the transmission input terminal, in FIG. 21 to be described below) of the first subarray TA1 may be disposed to be point symmetric to a reception terminal (e.g., a second reception port RA2, which corresponds to the reception input terminal, in FIG. 21 to be described below) of the second subarray SA2, and a reception input terminal (e.g., a first reception port RA1, which corresponds to the reception input terminal, in FIG. 21 to be described below) of the first subarray SA1 may be disposed to be point symmetric to a transmission input terminal (e.g., a second transmission port TA2, which corresponds to the transmission input terminal, in FIG. 21 to be described below) of the second subarray SA2. The correlation between the first and second subarrays SA1 and SA2 and the transmission/reception ports may be the same in third and fourth subarrays SA3 and SA4 of the second antenna module 400*f*.

According to various embodiments, the first subarray SA1 of the first antenna module 400*e* may be disposed to be point symmetric to the fourth subarray SA4 of the second antenna module 400*f*, and the second subarray SA2 of the first antenna module 400*e* may be disposed to be point symmetric to the third subarray SA3 of the second antenna module 400*f*. According to an embodiment, when the second antenna module 400*f* is horizontally moved from the position shown in FIG. 20, and projected while overlapping the first antenna module 400*e*, the antenna parts, the feeding network parts and/or the communication circuit parts (e.g., the antenna part 301, the feeding network part 320, and/or the communication circuit part 303 of FIG. 6) of the two antenna modules 400*e* and 400*f* may be substantially identical. In another embodiment, when the second antenna module 400*f* is rotated by 180 degrees from the position shown in FIG. 20, and projected while overlapping the first antenna module 400*e*, the first antenna module 400*e* and the second antenna module 400*f* may have routing parts (e.g., the routing part 330 in FIGS. 13B, 14B, and/or 15B) having a substantially identical structure. For example, when the communication circuit part 303 and the routing part 330 shown in FIG. 6 are a portion of the structure of the first antenna module 400*e*, a portion of the structure of the second antenna module 400*f* may be formed or manufactured by stacking, on or over the communication circuit part 303 in FIG. 6, the routing part 330 in a state of being rotated by 180 degrees in FIG. 6.

According to various embodiments, in the arrangement structure of the antenna modules 400*e* and 400*f* in FIG. 20, the first subarray SA1 and the third subarray SA3 may be combined to generate dual polarizations orthogonal to each other, and the second subarray SA2 and the fourth subarray SA4 may be combined to generate dual polarizations orthogonal to each other. According to one embodiment, in the arrangement structure of the antenna modules 400*e* and 400*f* shown in FIG. 20, the reception input terminal (e.g., the second reception port RA2 in FIG. 21) of the third subarray SA3 may correspond to the transmission input terminal (e.g., the first transmission port TA1 in FIG. 21) of the first subarray SA1, and the transmission input terminal (e.g., the second transmission port TA2 in FIG. 21) of the third subarray SA3 may correspond to the reception input terminal (e.g., the first reception port RA1 in FIG. 21) of the first subarray SA1. For example, in the first antenna module 400*e* and the second antenna module 400*f*, the arrangement of the subarrays 401*e* and 401*f* or the arrangement of the antenna elements 411*a* and 411*b* in the subarrays 401*e* and 401*f* may be substantially the same, the transmission input terminals and the reception input terminals of the paired subarrays (e.g., the first subarray SA1 and the third subarray SA3 and/or the second subarray SA2 and the fourth subarray SA4) may be disposed in opposite directions with respect to each other. Accordingly, the paired subarrays (e.g., the first subarray SA1 and the third subarray SA3 and/or the second subarray SA2 and the fourth subarray SA4) may generate dual polarizations orthogonal to each other.

As such, in the antenna module(s) (e.g., the antenna modules 300, 400*e*, or 400*f* in FIGS. 5, 6, and/or 20) according to various embodiments disclosed herein, the subarrays, and the transmission input terminals or the reception input terminals of the subarrays may be disposed in a point-symmetrical structure. For example, the transmission input terminals and the reception input terminals of paired subarrays (e.g., the first subarray SA1 and the third subarray SA3 and/or the second subarray SA2 and the fourth subarray SA4) in the two antenna modules 400*e* and 400*f* may be disposed in opposite directions with respect to each other. As the transmission input terminals and the reception input terminals of the paired subarrays are disposed in opposite directions with respect to each other, when the antenna elements and/or the subarrays of the first antenna module 400*e* generate a first polarization, the antenna elements and/or the subarrays of the second antenna module 400*f* may generate a second polarization perpendicular to the first polarization. For example, as the routing part is realized so that the arrangement of the antenna elements and the feeding network parts and/or the communication circuit parts are substantially the same and the transmission input terminals and the reception input terminals of the paired subarrays are disposed in opposite directions with respect to each other, the antenna modules according to various embodiments disclosed herein may easily implement dual polarization and through this, a multi-input multi-output (MIMO) system may be easily implemented. In some embodiments, two antenna modules combined to implement dual polarization may have substantially the same communication circuit part and/or the feeding network part and the routing part of one antenna module may be formed to be rotated by 180 degrees with respect to the other antenna module. For example, two antenna modules generating different polarizations may be manufactured in substantially the same process, and design or verification of the two antenna modules may be easy.

Figure 21:
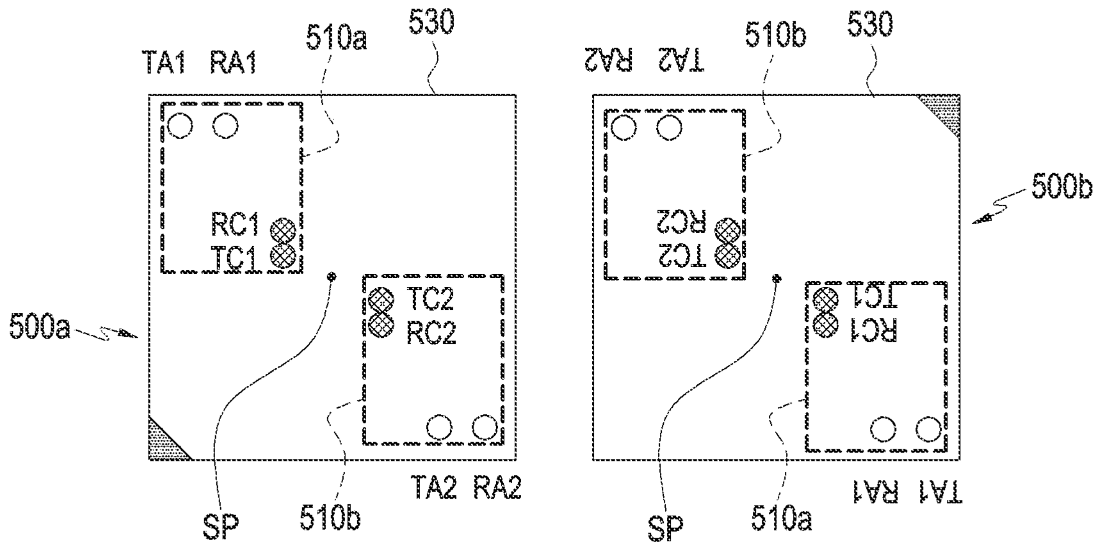
FIG. 21 is a view illustrating a principle of implementing double polarization by combining antenna modules according to various embodiments disclosed herein.

FIG. 21 is a view illustrating a principle of implementing double polarization by combining antenna modules 500*a* and 500*b* (e.g., the antenna modules 300, 400*e*, or 400*f* in FIGS. 5, 6, and/or 20) according to various embodiments disclosed herein.

A description of arrangement of subarrays 510*a* and 510*b*, transmission ports TA1 and TA2, and/or reception ports RA1 and RA2 in the antenna modules 500*a* and 500*b* will be given with reference to FIG. 21. FIG. 21 is a view illustrating a network part and/or routing part 530 (e.g., the network part 302 in FIG. 5 and/or the routing part 330 in FIGS. 5 and 6) disposed between a communication circuit part (e.g., the communication circuit part 303 in FIG. 5) and an antenna part (e.g., the antenna part 301 in FIG. 5), and for example, the network part 302 may electrically connect a communication circuit (e.g., the communication circuit part 341 in FIG. 5) and antenna elements (e.g., the antenna elements 301*a*, 311*a*, and 312*a* in FIG. 5). Although not shown, the network part 302 may provide a transmission line connecting the communication circuit 341 and the antenna elements 301*a*, the configuration of the transmission line has been described with reference to FIGS. 9 to 15C, etc., and thus a detailed description thereof will be omitted. In the embodiment disclosed herein, the antenna parts, the feeding network parts, and/or the communication circuit parts (e.g., the antenna part 301, the feeding network part 320, and/or the communication circuit part 303 in FIG. 6) may be identical to each other, and the routing parts (e.g., the routing part 330 in FIGS. 6, 13*b*, 14*b*, and/or 15*b*) may be substantially identical but may have a shape of being rotated 180 degrees relative to each other.

Referring further to FIG. 21, the routing part 530 (e.g., the routing part 330 in FIGS. 6, 13*b*, 14*b*, and/or 15*b*) of the first antenna module 500*a* and the second antenna module 500*b* may include transmission ports TA1 and TA2 corresponding to the transmission input terminals of the subarrays 510*a* and 510*b* and reception ports RA1 and RA2 corresponding to the reception input terminals of the subarrays 510*a* and 510*b*. For example, each of the antenna module 500*a* and 500*b* may include the first transmission port TA1 corresponding to the transmission input terminal of the first subarray 510*a*, the first reception port RA1 corresponding to the reception input terminal of the first subarray 510*a*, the second transmission port TA2 corresponding to the transmission input terminal of the second subarray 510*b*, and the second reception port RA2 corresponding to the reception input terminal of the second subarray 510*b*. According to an embodiment, in each of the antenna modules 500*a* and 500*b*, the first subarray

510a and the second subarray 510b may be disposed to be point symmetrical to each other, and with respect to a symmetry point (SP) of the first subarray 510a and the second subarray 510b, the first transmission port TA1 may be disposed to form point symmetry with the second reception port RA2, and the first reception port RA1 may be disposed to form point symmetry with the second transmission port TA2.

In this arrangement structure, the routing part 530 (e.g., the routing part 330 in FIGS. 6, 13b, 14b, and/or 15b) of the second antenna module 500b may be in a structure rotated by 180 degrees with respect to the routing part (530) of the first antenna module 500a. For example, the first subarray 510a (e.g., the first subarray SA1 in FIG. 20) of the first antenna module 500a and the second subarray 510b (e.g., the third subarray SA3 in FIG. 20) are disposed to be paired with each other, and the transmission ports and the reception ports of the paired subarrays may be disposed opposite to each other. Accordingly, the first subarray 510a of the first antenna module 500a and the second subarray 510b are disposed to be paired with each other, and the two subarrays may realize double polarizations orthogonal to each other. As such, dual polarization may be implemented by paired subarrays by arranging the subarrays to be point symmetric to each other and using the structure of the routing part 530 in one antenna module. For example, various embodiments disclosed herein may implement dual polarization by combining antenna modules including routing parts which are generally identical to each other and rotated 180 degrees with respect to each other and an electronic device may be provided with a better communication environment (e.g., a MIMO communication system) by including multiple antenna modules.

According to various embodiment, the network part (e.g., the routing part 530) may include a first transmission terminal TC1 disposed to correspond to a first transmission output terminal among output terminals of the communication circuit (e.g., the communication circuit 341 in FIG. 5), a first reception terminal RC1 disposed to correspond to a first reception output terminal among the output terminals of the communication circuit 341, a second transmission terminal TC2 disposed to correspond to a second transmission output terminal among output terminals of the communication circuit 341, and/or a second reception terminal RC2 disposed to correspond to a second reception output terminal among output terminals of the communication circuit 341. Since the communication circuit 341 is provided in the form of an integrated chip, the output terminals may be at fixed positions, and the first transmission terminal TC1, the first reception terminal RC1, the second transmission terminal TC2, and/or the second reception terminal RC2 may be disposed at a position corresponding to one of the output terminals of the communication circuit 341. In the network part, for example, the routing part 530, through transmission lines (now shown) (e.g., the second transmission line 316 in FIG. 5), the first transmission terminal TC1 may be electrically connected to the first transmission port TA1, the second transmission terminal TC2 to the second transmission port TA2, and/or the second reception terminal RC2 to the second reception port RA2.

According to various embodiments, the first transmission terminal TC1 may be disposed to be symmetrical to the second transmitting end TC2 with respect to the symmetry point SP, and the first reception terminal RC1 may be disposed be symmetrical to the second reception terminal RC2 with respect to the symmetry point SP. However, various embodiments disclosed herein are not limited thereto, and the transmission terminals TC1 and TC2 and the reception terminals RC1 and RC2 may be appropriately disposed in the routing part 530 according to the shape of an integrated chip on which the communication circuit 341 is mounted or the positions of output terminals of the communication circuit 341. For example, even if the subarrays form a 2×8 array and the first subarray in 1×1 position and the second subarray in 2×8 position are arranged to be symmetrical to each other, the transmission/reception terminals (e.g., the first transmission terminal TA1 and the first reception terminal RA1 in FIG. 21) connected to the first subarray are not necessarily disposed to be symmetrical to the transmission/reception terminals (e.g., the second transmission terminal TA2 and the second reception terminal RA2 in FIG. 21) with respect to the symmetry point. In the configuration of the routing part 530, the transmission terminals TC1 and TC2 are disposed to be point symmetrical to each other, the reception terminals RC1 and RC2 are disposed to be point symmetrical to each other, and the transmission ports TA1 and TA2 are disposed to be point symmetrical to the reception ports RA2 and RA1, and thus the two antenna modules 500a and 500b may be substantially identical to the antenna part 301, the feeding network part 320, and/or the communication circuit part 303 in FIG. 6 and may implement different dual polarizations, for example, dual polarizations substantially orthogonal to each other.

Figure 22:
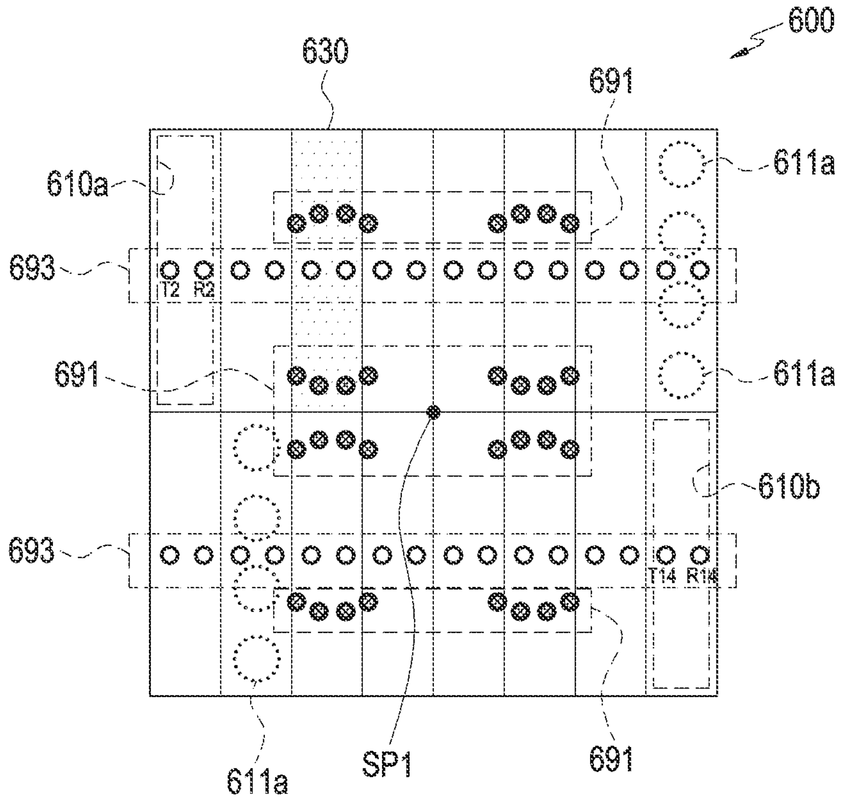
FIG. 22 is a view illustrating transmission/reception port arrangement of a routing part in an antenna module according to various embodiments disclosed herein.

FIG. 22 is a view illustrating transmission/reception port 693 arrangement of a routing part 630 (e.g., the routing part 330 or 530 in FIGS. 5 and 21) in an antenna module 600 (e.g., the antenna module 300, 400e, 400f, 500a, or 500b in FIGS. 5, 6, 20, and/or 21) according to various embodiments disclosed herein. FIG. 23 is a view illustrating a network part 302 including the routing part 630 in FIG. 22 in an antenna module (e.g., the antenna module 300, 400e, 400f, 500a, or 500b in FIGS. 5, 6, 20, and/or 21) according to various embodiments disclosed herein.

The embodiment may be described with reference to a portion of FIGS. 5 and 6, and FIG. 23 is an excerpt of a portion (e.g., the network part 302, etc.) of FIG. 6. In the embodiment shown in FIGS. 22 and/or 23, antenna elements 611a may form an 8×8 array and each of subarrays 610a and 610b may include the antenna elements of a 4×1 array. However, various embodiments disclosed herein are not limited thereto and the number and arrangement of the antenna elements 611a and the number and arrangement of the subarrays 610a and 610b obtained by selectively combining the antenna elements 611a may vary. In some embodiments, the antenna elements 611a may form a 2n×2n array and the subarrays 610a and 610b may form a 2n×2n array. For example, the antenna elements may form an n×1 array within each of the subarrays. In some embodiments, the antenna elements may form a 2n×2n array and the subarrays may form a 2n×2 array. For example, the antenna elements 611a may form a 1×n array within the subarrays 610a and 610b. Here, "the arrangement of the subarrays 610a and 610b" may refer to the arrangement in the configuration in which the first subarray 610a and the second subarray 610b in FIG. 21 are provided in plurality. The arrangement of the subarrays 610a and 610b and the arrangement of the antenna elements 611a may be variously adjusted according to specifications required for an electronic device (e.g., the electronic device 101 in FIG. 1) in which the antenna module 600 and/or the antenna module 600 to be actually manufactured is mounted.

Referring to FIGS. 22 and 23, a communication circuit (e.g., the communication circuit 341 in FIG. 5) may include output terminals TO and RO corresponding to the number of the transmission input terminals TX and the reception terminals Rx of the subarrays. The number or positions of the output terminals TO and RO of the communication circuit 341, for example, an integrated chip is designated according to an international standard, and thus the shape or arrangement of the antenna elements 611*a* and a transmission line (e.g., the network part 302) from the communication circuit 341 to the antenna elements 611*a* may be appropriately designed according to specifications required for the electronic device 101 in which the antenna module 600 and/or the antenna module 600 to be actually manufactured is mounted.

According to various embodiments, a communication circuit part (e.g., the communication circuit part 303 in FIG. 5) may include multiple vias (e.g., the first via 317 in FIG. 5) provided as transmission lines for connecting the communication circuit 341 and the network part 302, and according to an embodiment, the communication circuit 341 may be understood as a portion of the communication circuit part 303. The network part 302, for example, the routing part 630 or 330 may provide a transmission line extending from the communication circuit 341 to each subarray, and transmission lines are branched within the network part (e.g., the feeding network 320) to be connected to each antenna element 611*a*. The routing part 630 or 330 may include multiple transmission/reception terminals 691 and TC/RC corresponding to the output terminals TO/RO of the communication circuit 341 and multiple transmission/reception ports 693 and TA/RA corresponding to the input terminals Tx and Rx of the subarray(s) 610*a* or 610*b*. Within the routing part 630 or 330, the transmission/reception ports 693 and TA/RA may be connected to one of the transmission/reception terminals 691 and TC/RC and/or the output terminals TO/RO of the communication circuit 341 through a transmission line (e.g., the second transmission line 316 in FIG. 5).

In FIG. 22, one subarray 610*a* or 610*b* may include the antenna elements 611*a* of a 4×1 array, and the antenna module 600 may include the subarrays 610*a* and 610*b* of a 2×8 array. For example, the antenna module 600 may include the antenna elements 611*a* of an 8×8 array. For convenience of description, hereinafter, a subarray at an 1×1 position is defined as a "first subarray 610*a*", and a subarray at a 2×8 position is defined as a "second subarray 610*b*". The first subarray 610*a* and the second subarray 610*b* may be disposed to be point symmetric with respect to a first symmetry point SP1 (e.g., the symmetry point SP in FIG. 21). Here, "disposed to be point symmetric with respect to the first symmetry point SP1" may mean that the arrangement of the antenna elements 611*a* forming the subarray, the transmission/reception input terminals Tx and Rx of the subarray, and/or the transmission/reception ports T2, R2, T14, and R14 is disposed on point symmetrical positions. For example, the transmission terminal Tx or the reception port T2 of the first subarray 610*a* may be disposed to be point symmetric to the reception terminal Rx or the reception port R14 of the second subarray 610*b*, and the reception input terminal Rx or the reception port R2 of the first subarray 610*a* may be disposed to be point symmetric to the transmission input terminal Tx or the transmission port T14 of the second subarray 601*b*.

According to various embodiments, when the antenna modules 600 of FIG. 22 are combined in pairs, the antenna modules 600 may generate dual polarizations orthogonal to each other as described above. For example, when a first antenna module (e.g., the first antenna module 500*a* in FIG. 21) including the routing part 630 in a state shown in FIG. 22 and a second antenna module (e.g., the second antenna module 500*b* in FIG. 21) formed by rotating the routing part 630 in FIG. 22 by 180 degrees are combined, the two antenna modules may include a subarray (subarrays) having directivity and generate dual polarizations orthogonal to each other. According to an embodiment, the two antenna modules 600 combined to implement vertical dual polarization may have a structure substantially identical to the antenna part 301, the feeding network part 320 and/or the communication circuit part 303 in FIG. 6 and having the routing part 630 (e.g., the routing part 330 in FIG. 6) rotated by 180 degrees with respect to each other. Accordingly, the subarray at 1×1 position of the first antenna module and the subarray at 1×1 position of the second antenna module may generate dual polarizations orthogonal to each other.

Figure 24:
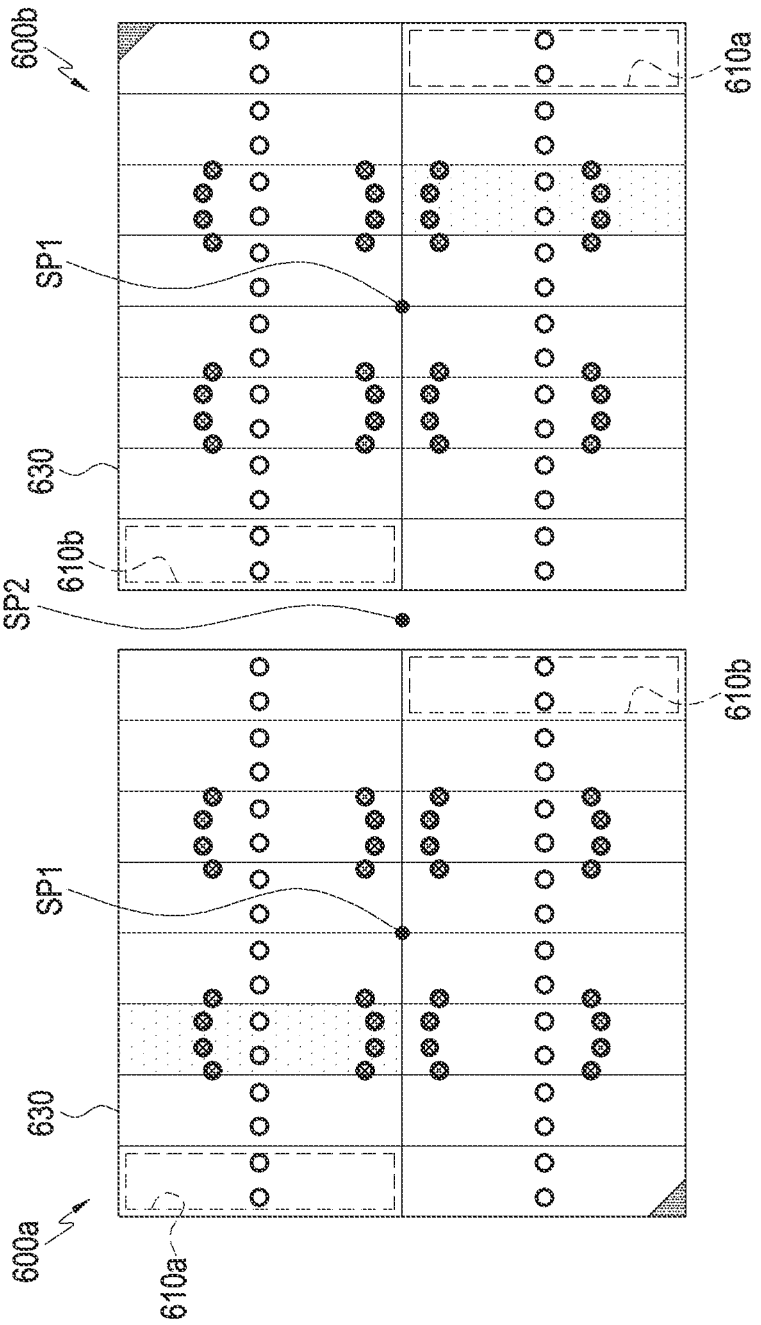
FIG. 24 is a view illustrating an example of implementing double polarization by combining antenna modules in FIG. 22.
Figure 25:
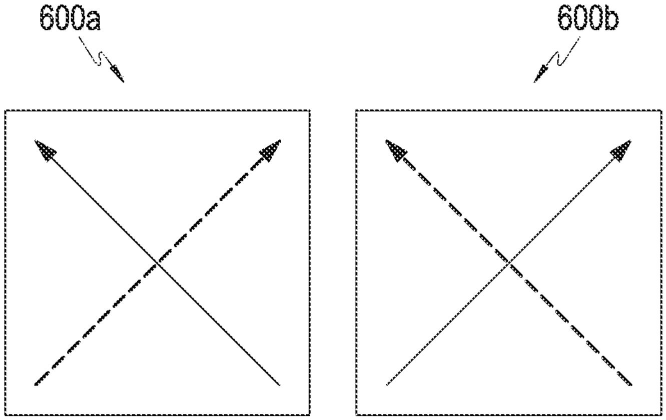
FIG. 25 is a view schematically illustrating double polarization implemented by the antenna modules in FIG. 23.

FIG. 24 is a view illustrating an example of implementing double polarization by combining antenna modules 600 in FIG. 22. FIG. 25 is a view schematically illustrating double polarization implemented by the antenna modules 600 in FIG. 23.

Referring to FIGS. 24 and 25, the antenna modules (e.g., the antenna module 300 or 600 in FIGS. 5 and/or 22) described above may be combined in at least one pair to implement dual polarizations orthogonal to each other, and an electronic device (e.g., the electronic device 101 in FIG. 1) may perform wireless communication by using at least one pair of antenna modules 600*a* and 600*b*. The antenna modules 600*a* and 600*b* may implement dual polarizations orthogonal to each other so as to provide a stable wireless communication environment like MIMO communication.

According to various embodiments, although the antenna modules 600*a* and 600*b* may have substantially the same structure in terms of the arrangement of the antenna elements 611*a*, the configuration of the subarrays 610*a* and 610*b*, and the configuration of the feeding network part and/or the communication circuit part (e.g., the feeding network part 320 and/or the communication circuit part 303 in FIG. 6), the routing part 630 (e.g., the routing part 330 in FIGS. 13B, 14B, and/or 15B) of the second module 600*b* may have a form rotated by 180 degrees compared to the first antenna module 600*a*. For example, the first subarray 610*a* and the second subarray 610*b* may be disposed to be point symmetric to each other with respect to the first symmetry point SP1 (e.g., the symmetry point SP in FIG. 21) within the first antenna module 600*a*, and the first subarray 610*a* and the second subarray 610*b* may be disposed to be point symmetric to each other with respect to the first symmetry point SP1 within the second antenna module 600*b*. In addition, the first subarray 610*a* of the first antenna module 600*a* and the first subarray 610*a* of the second antenna module 600*b* may be disposed to be point symmetric to each other with respect to the second symmetry point SP2, and the second subarray 610*b* of the first antenna module 600*a* and the second subarray 610*b* of the second antenna module 600*b* may be disposed to be point symmetric to each other with respect to the second symmetry point SP2. In another embodiment, when the first subarray 610*a* is disposed at 1×1 position on the first antenna module 600*a*, the second subarray 610*b* may be disposed at 1×1 position on the second antenna module 600*b*, and when the second subarray 610*b* is disposed at 2×8 position on the first antenna module 600*a*, the first subarray 610*a* may be disposed at 2×8 position on the second antenna module 600*b*.

In the above arrangement structure, the first subarray 610*a* of the first antenna module 600*a* and the second subarray 610*b* of the second antenna module 600*b*, which are disposed at 1×1 positions, may generate dual polarizations orthogonal to each other, and the second subarray 610*b* of the first antenna module 600*a* and the first subarray 610*a* of the second antenna module 600*b*, which are disposed at 2×8 positions, may generate dual polarizations orthogonal to each other. According to an embodiment, in the antenna modules 600*a* and 600*b*, the routing parts 630 of the first antenna module 600*a* and the second antenna module 600*b* may be formed in a state rotated 180 degrees with respect to each other while the antenna elements and/or the subarray(s) thereof are substantially identical to each other. As the routing parts 630 of the first antenna module 600*a* and the second antenna module 600*b* are formed in a state rotated 180 degrees with respect to each other, positions of the transmission ports (e.g., the transmission input terminal Tx) and the reception ports (e.g., the reception input terminal Rx) of the subarray of the first antenna module 600*a* and the subarray of the second antenna module 600*b* disposed at the same row and column are reversed and the subarrays disposed at the same row and column may be combined to generate dual polarizations orthogonal to each other.

In describing the embodiment, it will be readily understood by those skilled in the art that although the positions of the first subarray 610*a* and the second subarray 610*b* arranged to form point symmetry with respect to the first symmetry point SP1 in one antenna module (600*a*, 600*b*) are specifically illustrated, various embodiments disclosed herein are not limited thereto, and in the antenna modules 600*a* and 600*b*, arbitrary subarrays or transmission/reception ports arranged to form point symmetry with each other may have the above positional relationship as well.

Figure 26:
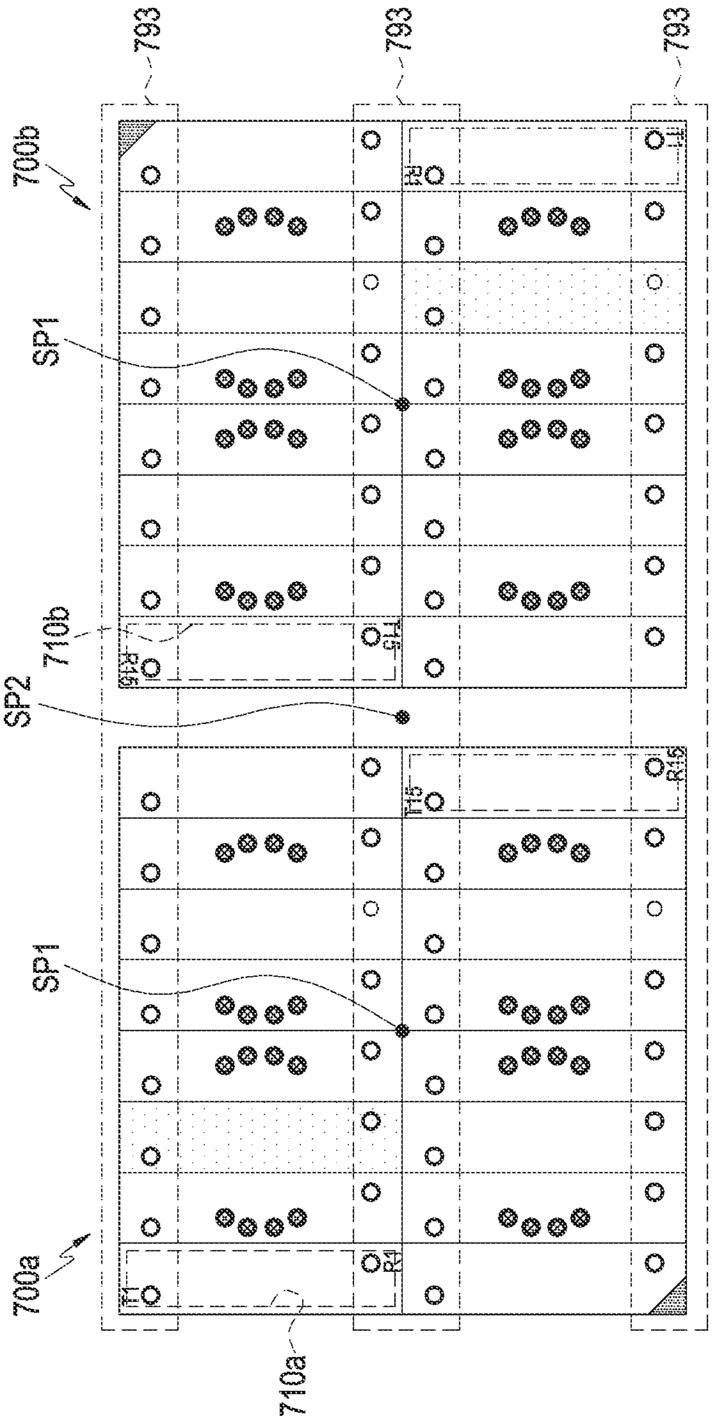
FIG. 26 and FIG. 27 are views illustrating a modification example of the antenna module(s) in FIG. 22 and a combination thereof.
Figure 27:
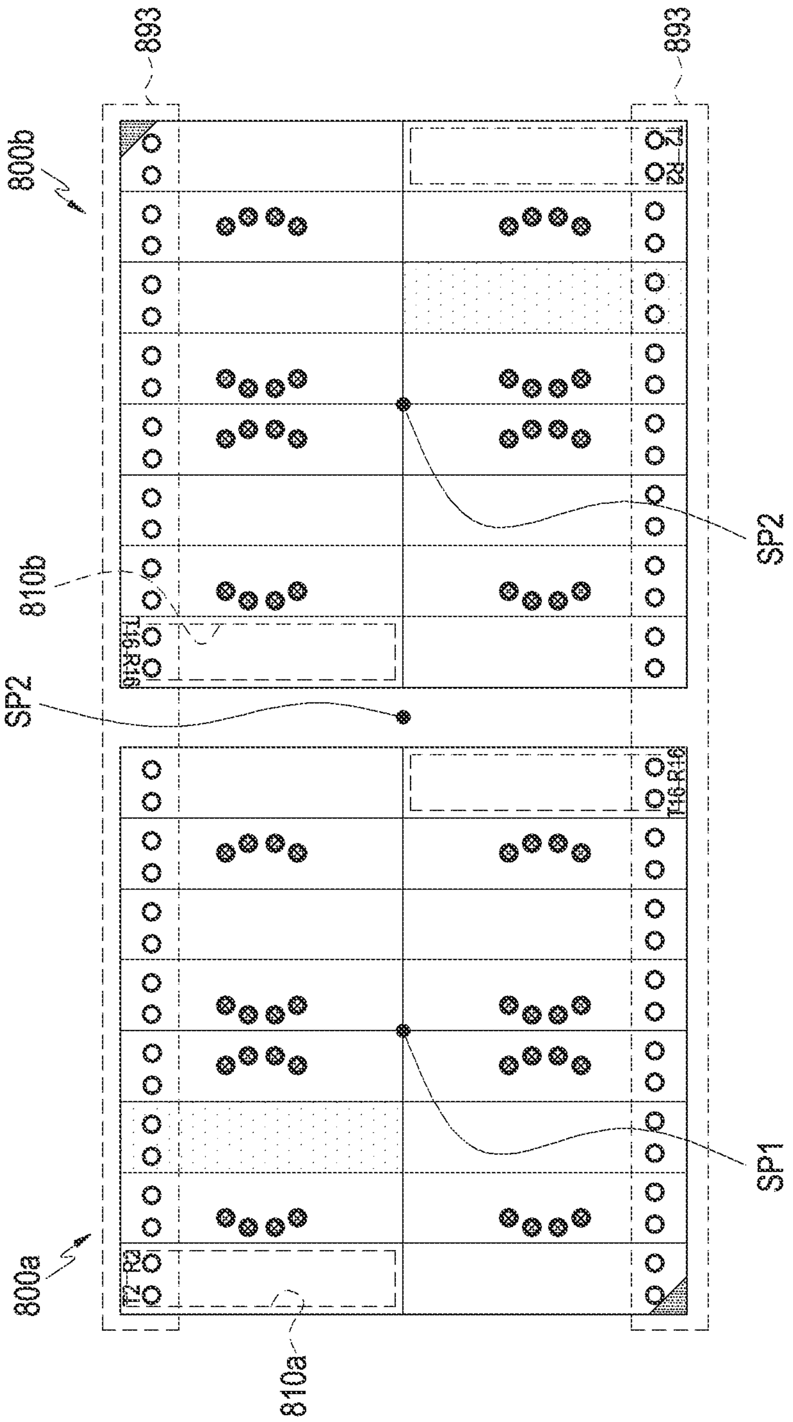

FIG. 26 and FIG. 27 are views illustrating a modification example of the antenna module(s) 600 in FIG. 22 and a combination thereof.

In the embodiment of FIG. 24, the configuration in which the transmission input terminals and the reception input terminals (e.g., the transmission/reception ports 693 in FIG. 22) of the subarrays 610*a* and 610*b* are disposed at the center portion of the subarrays 610*a* and 610*b* to form two rows is exemplified, but if the above-described point-symmetric structure is satisfied, the arrangement of the transmission/reception ports 693 may be variously changed.

According to an embodiment, as shown in FIG. 26, on one subarray 710*a* or 710*b*, the transmission/reception ports 793, T1, R1, T15, or R15 may be disposed adjacent to both ends of the subarray 710*a* or 710*b* and may be disposed to form one row at each of the upper end and the lower end of the antenna module 700*a* or 700*b* and form two rows at the center portion of the antenna module 700*a* or 700*b*. In another embodiment, as shown in FIG. 27, on one subarray 810*a* or 810*b*, the transmission/reception ports 893, T1, R1, T15, or R15 may be disposed adjacent to one end of the subarray 810*a* or 810*b* and may be disposed to form one row at each of the upper end and the lower end of the antenna module 800*a* or 800*b*. In still another embodiment (not shown), on one subarray, the transmission port and the reception port may be disposed adjacent to one end of the subarray and may be disposed to form two rows at the center portion of the antenna module.

In some embodiments, when manufacturing an antenna module including the above-described transmission port and reception port, if the network part 302 (e.g., the routing part 330, 530, or 630 is stacked in a state in which the antenna part 301 and/or the communication circuit part 303 of the first antenna module is arranged at a first position, the network part 302 (e.g., the routing part 330, 530, or 630) may be stacked on the second second antenna module in a state in which the antenna part 301 and/or the communication circuit part 303 is arranged at a second position rotated 180 degrees based on a symmetry point (e.g., the symmetry point SP in FIG. 21 or the first symmetry point SP1 in FIG. 22). For example, the network parts 302 (e.g., the routing part 330, 530, and 630) of the first antenna module and the second antenna module have substantially the same structure and may be manufactured through the same process, and the above-described first antenna module and second antenna module may be distinguished merely according to an arrangement state of the antenna part 301 and/or the communication circuit part 303 in a manufacturing process.

In the above-described embodiment, for convenience of description, the output terminal (e.g., the output terminals TO/RO in FIG. 21) of the communication circuit and the transmission/reception terminal (e.g., the transmission/reception terminals TC/RC in FIG. 21) of the network part (e.g., the routing part) have been separately described, but the output terminal(s) and the transmission/reception terminal(s) may be a portion of the first vias 317 in FIG. 5. Similarly, the input terminals (e.g., the input terminal Tx or Rx in FIG. 21) of the subarray and the transmission/reception port (e.g., the transmission/reception port TA/RA in FIG. 21) of the network part (e.g., the routing part) have been separately described, but the input terminal(s) and the transmission/reception port(s) may be a portion of the second vias 318 in FIG. 5. In the drawings of the above-described embodiments, it has been exemplified that the area in which the communication circuit and/or the output terminals of the communication circuit are arranged is larger than the arrangement area of the antenna elements and/or the arrangement area of the subarray, but it should be noted that this is for convenience of description. For example, in an antenna module actually manufactured, antenna elements may be arranged in an area smaller than an area in which the communication circuit and/or output terminals of the communication circuit are disposed. The antenna element arrangement or the size of the arrangement area may be configured in various ways according to specifications required for the antenna module or electronic device and/or a frequency band of wireless communication performed through the antenna module.

As described above, according to various embodiments disclosed herein, an antenna module (e.g., the antenna module 300, 400*e*, 400*f*, 500*a*, 500*b*, 600, 600*a*, or 600*b* in FIGS. 5, 6 and/or 20 to 27) and/or an electronic device including (e.g., the electronic device 101 in FIG. 1) same may include a communication circuit part (e.g., the communication circuit part 303 in FIG. 5) in which a communication circuit (e.g., the communication circuit 341 in FIG. 5) is disposed, an antenna part (e.g., the antenna part 301 in FIGS. 5 and/or 6) stacked up on or above the communication circuit part and including multiple antenna elements (e.g., the antenna elements 301*a* and 611*a* in FIGS. 5 and/or 22), and a network part (e.g., the network part 303 or the routing part 330 or 630 in FIGS. 5, 6, 22, and/or 23) disposed between the communication circuit part and the antenna part and providing transmission lines for connecting the communication circuit and the antenna elements.

The antenna part may include at least one first subarray (e.g., the first subarray 510*a* or 610*a* in FIGS. 21 to 24) configured by a combination of a part of the antenna elements, and at least one second subarray (e.g., the second subarray 510*b* or 610*b* in FIGS. 21 to 24) configured by a combination of another part of the antenna elements and disposed to be point symmetric to the first subarray.

The network part may include a first transmission port (e.g., the transmission port T2 or TA/RA in FIGS. 22 and 23) corresponding to a transmission input terminal (e.g., the transmission input terminal Tx in FIG. 23) of the first subarray, a first reception port (e.g., the reception port R2 or TA/RA in FIGS. 22 and 23) corresponding to a reception input terminal (e.g., the reception input terminal Rx in FIG. 23) of the first subarray, a second transmission port (e.g., the transmission port T14 or TA/RA in FIGS. 22 and 23) corresponding to a transmission input terminal (e.g., the transmission input terminal Tx in FIG. 23) of the second subarray, and a second reception port (e.g., the reception port R14 or TA/RA in FIGS. 22 and 23) corresponding to a reception input terminal (e.g., the reception input terminal Rx in FIG. 23) of the second subarray.

With respect to a symmetry point (e.g., the symmetry point SP in FIG. 21 or the first symmetry point SP1 in FIGS. 22 and 24) of the first subarray and the second subarray, the first transmission port may be disposed to be point symmetric to the second reception port, and the first reception port may be disposed to be point symmetric to the second transmission port.

According to various embodiment, the network part may include a first transmission terminal (e.g., the transmission terminal TC1 in FIG. 21 and/or the transmission/reception terminal 691 or TC/RC in FIGS. 22 and 23) disposed to correspond to a first transmission output terminal among output terminals TO/RO of the communication circuit and connected to the first transmission port, a first reception terminal (e.g., the reception terminal RC1 in FIG. 21 and/or the transmission/reception terminal 691 or TC/RC in FIGS. 22 and 23) disposed to correspond to a first reception output terminal among the output terminals of the communication circuit 341 and connected to the first reception port, a second transmission terminal (e.g., the transmission terminal TC2 in FIG. 21 and/or the transmission/reception terminal 691 or TC/RC in FIGS. 22 and 23) disposed to correspond to a second transmission output terminal among the output terminals of the communication circuit 341 and connected to the second transmission port, and a second reception terminal (e.g., the reception terminal RC2 in FIG. 21 and/or the transmission/reception terminal 691 or TC/RC in FIGS. 22 and 23) disposed to correspond to a second reception output terminal among the output terminals of the communication circuit 341 and connected to the second reception port, wherein with respect to the symmetry point, the first transmission terminal may be disposed to be symmetric to the second transmission terminal and the first reception terminal may be disposed to be symmetric to the second reception terminal.

According to various embodiments, a portion (e.g., the second transmission line 316 and/or the first via 317 in FIG. 5) of the transmission lines may respectively connect the first transmission port, the first reception port, the second transmission port, and the second reception port to one of the output terminals of the communication circuit.

According to various embodiments, the first subarray and the second subarray may include the antenna elements of an n×m array ("n" and "m" are different natural numbers).

According to various embodiments, in the first subarray or the second subarray, the antenna elements may be arranged to form one of a 2×1, 4×1, or 4×2 array.

According to various embodiments, in the antenna part, the antenna elements may be arranged to form a 2n×2n array.

According to various embodiments, in the first subarray or the second subarray, the antenna elements may be arranged to form an n×1 array or a 1×n array.

According to various embodiments, the multiple first subarrays and the multiple second subarrays may be arranged to form a 2×2n array or a 2n×2 array.

According to various embodiments, a portion (e.g., the feeding network part 320 or the first transmission line 315 in FIG. 5) of the transmission lines may include a branch structure for connecting one selected from the first transmission port, the first reception port, the second transmission port, and the second reception port to multiple points.

According to various embodiments disclosed herein, an electronic device may include a first antenna module (e.g., the first antenna module 400*e*, 500*a*, or 600*a* in FIGS. 20, 21, and/or 24) and a second antenna module (e.g., the second antenna module 400*f*, 500*b*, or 600*b* FIGS. 20, 21, and/or 24) which are arranged to be adjacent to each other, wherein each of the first antenna module and the second antenna module includes a communication circuit part in which a communication circuit is disposed, an antenna part arranged to be stacked up on or above the communication circuit part and including multiple antenna elements, and a network part disposed between the communication circuit part and the antenna part and providing transmission lines for connecting the communication circuit and the antenna elements.

The antenna part may include at least one first subarray configured by a combination of a part of the antenna elements, and at least one second subarray configured by a combination of another part of the antenna elements and disposed to be point symmetric to the first subarray.

The network part may include a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray.

With respect to a symmetry point (e.g., the symmetry point SP in FIG. 21 and/or the first symmetry point SP1 in FIG. 22) of the first subarray and the second subarray, the first transmission port may be disposed to be point symmetric to the second reception port, and the first reception port may be disposed to be point symmetric to the second transmission port.

The first subarray of the first antenna module may be disposed to be point symmetric to the first subarray of the second antenna module.

With respect to a second symmetry point (e.g., the second symmetry point SP2 in FIG. 24) of the first subarray of the first antenna module and the first subarray of the second antenna module, the second subarray of the first antenna module may be disposed to be point symmetric to the second subarray of the second antenna module.

According to various embodiment, the network part may include a first transmission terminal disposed to correspond to a first transmission output terminal among output terminals of the communication circuit and connected to the first transmission port, a first reception terminal disposed to correspond to a first reception output terminal among the output terminals of the communication circuit and connected to the first reception port, a second transmission terminal disposed to correspond to a second transmission output terminal among the output terminals of the communication circuit and connected to the second transmission port, and a second reception terminal disposed to correspond to a second reception output terminal among the output terminals of the communication circuit 341 and connected to the second reception port, wherein with respect to the symmetry point, the first transmission terminal may be disposed to be symmetric to the second transmission terminal and the first reception terminal may be disposed to be symmetric to the second reception terminal.

According to various embodiments, the first subarray of the first antenna module and the second subarray of the second antenna module may be configured to generate polarizations orthogonal to each other, and the second subarray of the first antenna module and the first subarray of the second antenna module may be configured to generate polarizations orthogonal to each other.

According to various embodiments, a portion of the transmission lines may respectively connect the first transmission port, the first reception port, the second transmission port, and the second reception port to one of the output terminals of the communication circuit.

According to various embodiments, the first subarray and the second subarray may include the antenna elements of an n×m array ("n" and "m" are different natural numbers).

According to various embodiments, in the first subarray or the second subarray, the antenna elements may be arranged to form one of a 2×1, 4×1, or 4×2 array.

According to various embodiments, in the antenna part, the antenna elements may be arranged to form a 2n×2n array.

According to various embodiments, in the first subarray or the second subarray, the antenna elements may be arranged to form an n×1 array or a 1×n array.

According to various embodiments, the multiple first subarrays and the multiple second subarrays may be arranged to form a 2×2n array or a 2n×2 array.

According to various embodiments, a portion of the transmission lines may include a branch structure for connecting one selected from the first transmission port, the first reception port, the second transmission port, and the second reception port to multiple points.

According to various embodiments disclosed herein, an antenna module and/or an electronic device including same may include a communication circuit part in which a communication circuit is disposed, an antenna part stacked up on or above the communication circuit part and including antenna elements arranged in a 2n×2n array ("n" is a natural number), and a network part disposed between the communication circuit part and the antenna part and providing transmission lines for connecting the communication circuit and the antenna elements.

The antenna part may include multiple first subarrays configured by a part of the antenna elements arranged in an n×1 array, and multiple second subarrays each of which is configured by the other part of the antenna elements in an n×1 array and disposed to be point symmetric to one of the multiple first subarrays.

The network part may include a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray.

The first subarray and the second subarray are combined to form a 2×2n subarray.

With respect to a symmetry point of the first subarray and the second subarray, the first transmission port may be disposed to be point symmetric to the second reception port, and the first reception port may be disposed to be point symmetric to the second transmission port.

The antenna module and the electronic device including same of various embodiments disclosed herein described above are not limited to the embodiments and drawings described above, and it will be apparent to those of ordinary skill in the art to which the present disclosure pertains that various substitutions, modifications, and changes are possible within the technical scope of the disclosure.

The invention claimed is:

1. An antenna module comprising:
- a communication circuit part in which a communication circuit is disposed;
- an antenna part stacked-up on or above the communication circuit part and comprising multiple antenna elements; and
- a network part disposed between the communication circuit part and the antenna part and providing transmission lines configured to connect the communication circuit part and the antenna elements,
- wherein the antenna part comprises:
  - at least one first subarray configured by a combination of a part of the antenna elements, and
  - at least one second subarray configured by a combination of another part of the antenna elements and disposed to be point symmetric to the first subarray with respect to a symmetry point,
- wherein the network part comprises:
  - a first transmission port corresponding to a transmission input terminal of the first subarray,
  - a first reception port corresponding to a reception input terminal of the first subarray,
  - a second transmission port corresponding to a transmission input terminal of the second subarray, and
  - a second reception port corresponding to a reception input terminal of the second subarray, and
- wherein, with respect to the symmetry point of the first subarray and the second subarray, the first transmission port is disposed to be point symmetric to the second reception port, and the first reception port is disposed to be point symmetric to the second transmission port.

2. The antenna module of claim 1,
- wherein the network part further comprises:
  - a first transmission terminal disposed to correspond to a first transmission output terminal among output terminals of the communication circuit and connected to the first transmission port,
  - a first reception terminal disposed to correspond to a first reception output terminal among output terminals of the communication circuit and connected to the first reception port,
  - a second transmission terminal disposed to correspond to a second transmission output terminal among output terminals of the communication circuit and connected to the second transmission port, and
  - a second reception terminal disposed to correspond to a second reception output terminal among output terminals of the communication circuit and connected to the second reception port, and
- wherein, with respect to the symmetry point, the first transmission terminal is disposed to be symmetric to the second transmission terminal and the first reception terminal is disposed to be symmetric to the second reception terminal.

3. The antenna module of claim 1, wherein a part of the transmission lines connects each of the first transmission port, the first reception port, the second transmission port, and the second reception port to one of the output terminals of the communication circuit.

4. The antenna module of claim 1,
- wherein the first subarray and the second subarray comprise the antenna elements of an n×m array, wherein n is a natural number larger than or equal to 1, and wherein m is a natural number larger than or equal to 1.

5. The antenna module of claim 4, wherein, in the first subarray or the second subarray, the antenna elements are arranged to form one of a 2×1, 4×1, or 4×2 array.

6. The antenna module of claim 1, wherein, in the antenna part, the antenna elements are arranged to form a 2n×2n array, and wherein n is a natural number larger than or equal to 1.

7. The antenna module of claim 1, wherein, in the antenna part, the antenna elements are arranged to form a 2n×2n array, wherein n is a natural number larger than or equal to 2, and wherein, in the first subarray or the second subarray, the antenna elements are arranged to form an n×1 array or an 1×n array.

8. The antenna module of claim 1, wherein, in the antenna part, the antenna elements are arranged to form a 2n×2n array, wherein n is a natural number larger than or equal to 4, and wherein in respective of the multiple first subarrays and the multiple second subarrays the antenna elements are arranged to form a 2×2n array or a 2n×2 array.

9. The antenna module of claim 1, wherein a part of the transmission lines comprise a branch structure configured to connect one selected from the first transmission port, the first reception port, the second transmission port, and the second reception port to multiple points.

10. The antenna module of claim 1, wherein the antenna elements are arranged to form a 2n×2n array, wherein n is a natural number larger than or equal to 4, wherein multiple first subarrays are each configured by a part of the antenna elements arranged in an n×1 array, wherein multiple second subarrays are each configured by the other part of the antenna elements arranged to form an n×1 array and disposed to be point symmetric to one of the multiple first subarrays, and wherein the first subarrays and the second subarrays are combined to form a 2×2n subarray.

11. An electronic device comprising a first antenna module and a second antenna module which are arranged to be adjacent to each other, wherein each of the first antenna module and the second antenna module comprises:

a communication circuit part in which a communication circuit is disposed, an antenna part arranged to be stacked up on or above the communication circuit part and comprising multiple antenna elements, and a network part disposed between the communication circuit part and the antenna part and providing transmission lines configured to connect the communication circuit part and the antenna elements, wherein the antenna part comprises:

at least one first subarray configured by a combination of a part of the antenna elements, and at least one second subarray configured by a combination of another part of the antenna elements and disposed to be point symmetric to the first subarray, wherein the network part comprises:

a first transmission port corresponding to a transmission input terminal of the first subarray, a first reception port corresponding to a reception input terminal of the first subarray, a second transmission port corresponding to a transmission input terminal of the second subarray, and a second reception port corresponding to a reception input terminal of the second subarray, wherein, with respect to a first symmetry point of the first subarray and the second subarray, the first transmission port is disposed to be point symmetric to the second reception port, and the first reception port is disposed to be point symmetric to the second transmission port, the first subarray of the first antenna module is disposed to be point symmetric to the first subarray of the second antenna module, and wherein, with respect to a second symmetry point of the first subarray of the first antenna module and the first subarray of the second antenna module, the second subarray of the first antenna module is disposed to be point symmetric to the second subarray of the second antenna module.

12. The electronic device of claim 11, wherein the first subarray of the first antenna module and the second subarray of the second antenna module are configured to generate polarizations orthogonal to each other, and the second subarray of the first antenna module and the first subarray of the second antenna module are configured to generate polarizations orthogonal to each other.

13. The electronic device of claim 11, wherein a part of the transmission lines connects each of the first transmission port, the first reception port, the second transmission port, and the second reception port to one of the output terminals of the communication circuit.

14. The electronic device of claim 11, wherein the first subarray and the second subarray comprise the antenna elements of an n×m array, wherein n is a natural number larger than or equal to 1, and wherein m is a natural number larger than or equal to 1.

15. The electronic device of claim 11, wherein a part of the transmission lines comprises a branch structure configured to connect one selected from the first transmission port, the first reception port, the second transmission port, and the second reception port to multiple points.

* * * * *